United States Patent [19]

Moran

[11] 4,257,097

[45] Mar. 17, 1981

[54] MULTIPROCESSOR SYSTEM WITH DEMAND ASSIGNABLE PROGRAM PAGING STORES

[75] Inventor: John C. Moran, Glen Ellyn, Ill.

[73] Assignee: Bell Telephone Laboratories, Incorporated, Murray Hill, N.J.

[21] Appl. No.: 968,446

[22] Filed: Dec. 11, 1978

[51] Int. Cl.³ .......................... G06F 9/46; G06F 15/16
[52] U.S. Cl. .................................................. 364/200
[58] Field of Search ... 364/200 MS File, 900 MS File

[56] References Cited

U.S. PATENT DOCUMENTS

| Re. 26,171 | 3/1967 | Falkoff . | |
|---|---|---|---|
| 3,348,210 | 10/1967 | Ochsner . | |
| 3,573,852 | 4/1971 | Watson et al. | 364/200 |
| 3,618,040 | 11/1971 | Kokubunji-Shi et al. . | |
| 3,648,252 | 3/1972 | Thron et al. . | |
| 3,699,533 | 10/1972 | Hunter | 364/200 |
| 3,706,077 | 12/1972 | Mori et al. . | |
| 3,735,360 | 5/1973 | Anderson et al. . | |
| 3,753,234 | 8/1973 | Gilbert et al. . | |
| 3,771,137 | 11/1973 | Barner et al. . | |
| 3,787,818 | 1/1974 | Arnold et al. . | |
| 3,833,889 | 9/1974 | Cray . | |
| 3,848,234 | 11/1974 | MacDonald | 364/200 |
| 3,934,232 | 1/1976 | Curley et al. | 364/200 |
| 4,056,844 | 11/1977 | Izumi | 364/900 |
| 4,073,005 | 2/1978 | Parkin | 364/200 |
| 4,078,254 | 3/1978 | Beausoleil et al. | 364/900 |
| 4,096,567 | 6/1978 | Millard et al. | 364/200 |

*Primary Examiner*—Gareth D. Shaw
*Assistant Examiner*—Eddie Chan
*Attorney, Agent, or Firm*—Howard R. Popper; Peter Visserman

[57] ABSTRACT

A plurality of stored-program controllable computer units $MP_{(o)}-MP_{(n)}$ are associated with a somewhat greater number of program stores $PS_{(o)}-PS_{(N+1)}$ in an arrangement with a main memory unit MBM and an activity memory unit AM in a manner such that each computer unit is only assigned to use that program store which has already been loaded with a program paged from the main memory unit. When a computer unit finishes with the program store it had been using, it obtains a new, already-loaded program store with which to work and causes the main memory unit to reload the store with which it has just finished working with a new program. In this manner, no computer unit must wait while a program is being paged into any program store.

11 Claims, 21 Drawing Figures

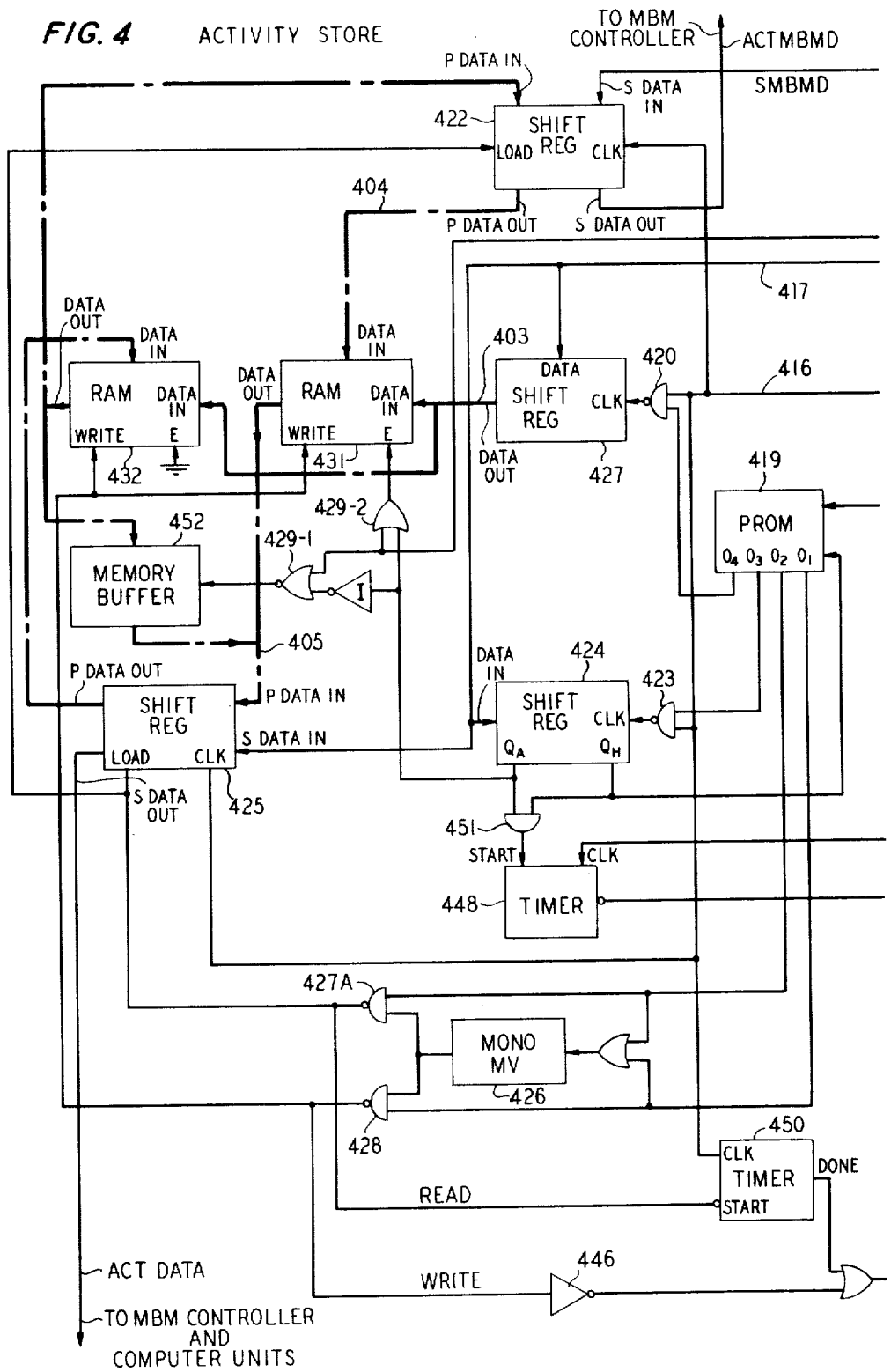
FIG. 4 ACTIVITY STORE

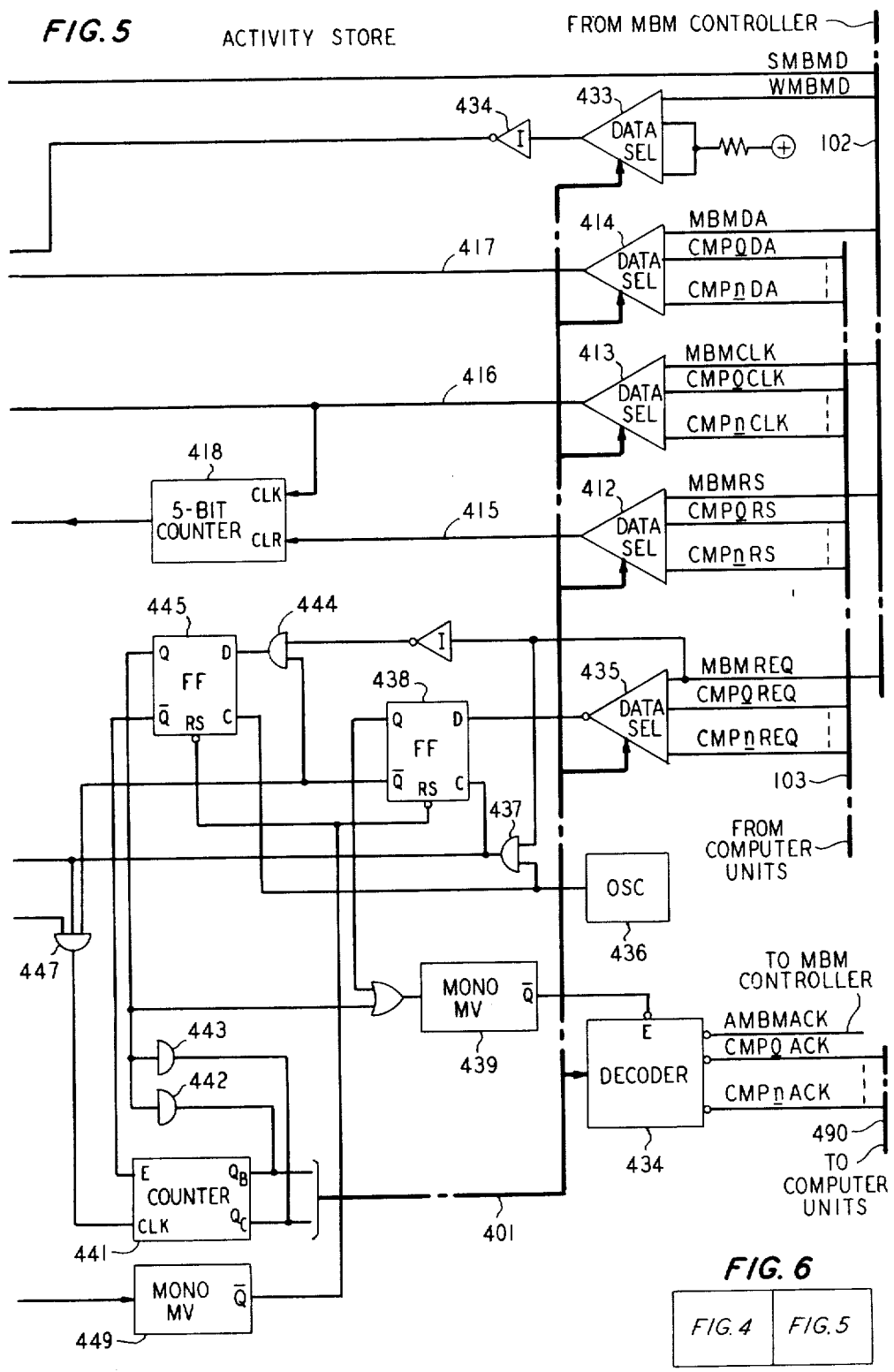

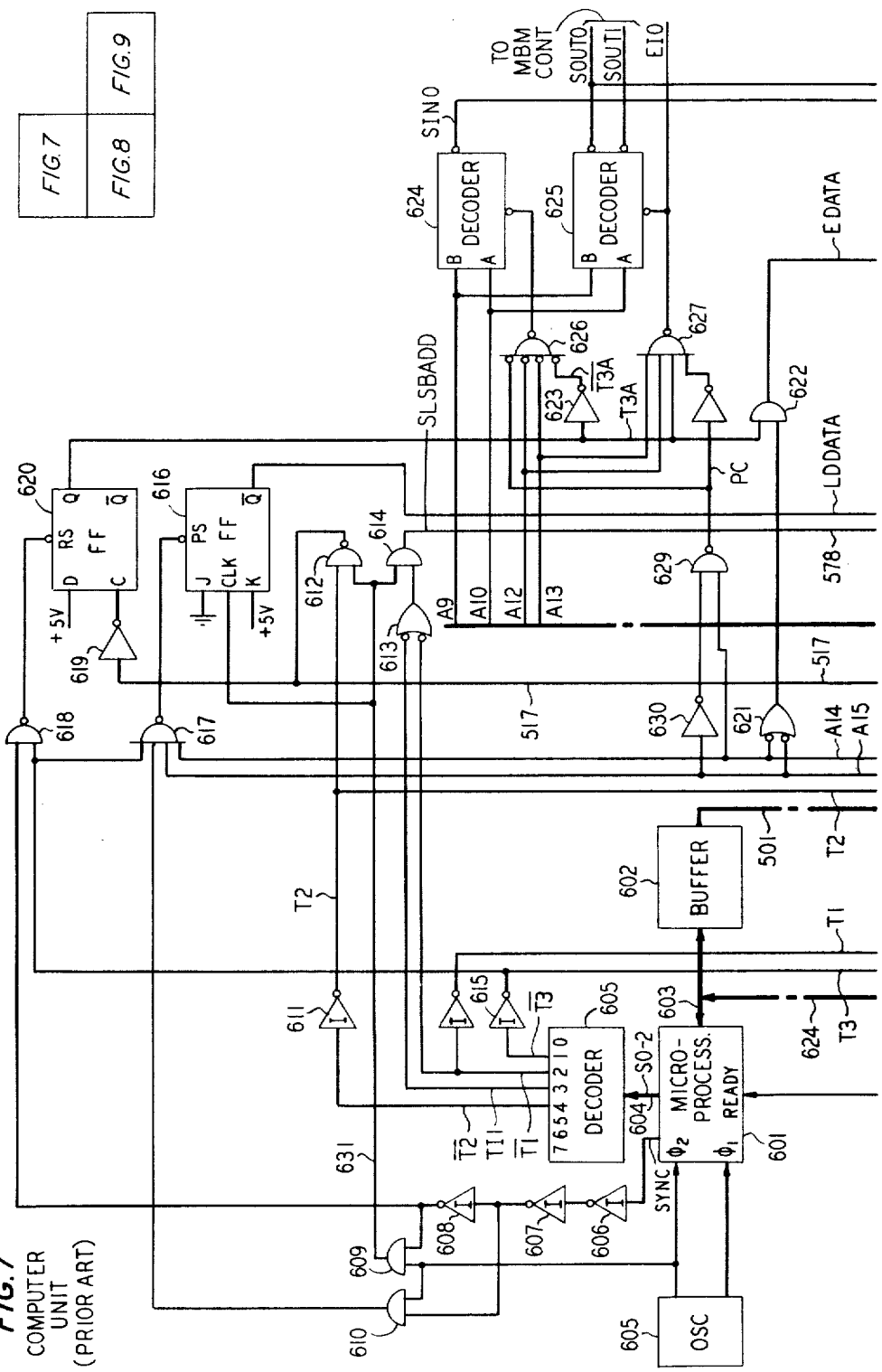
FIG. 7 COMPUTER UNIT (PRIOR ART)

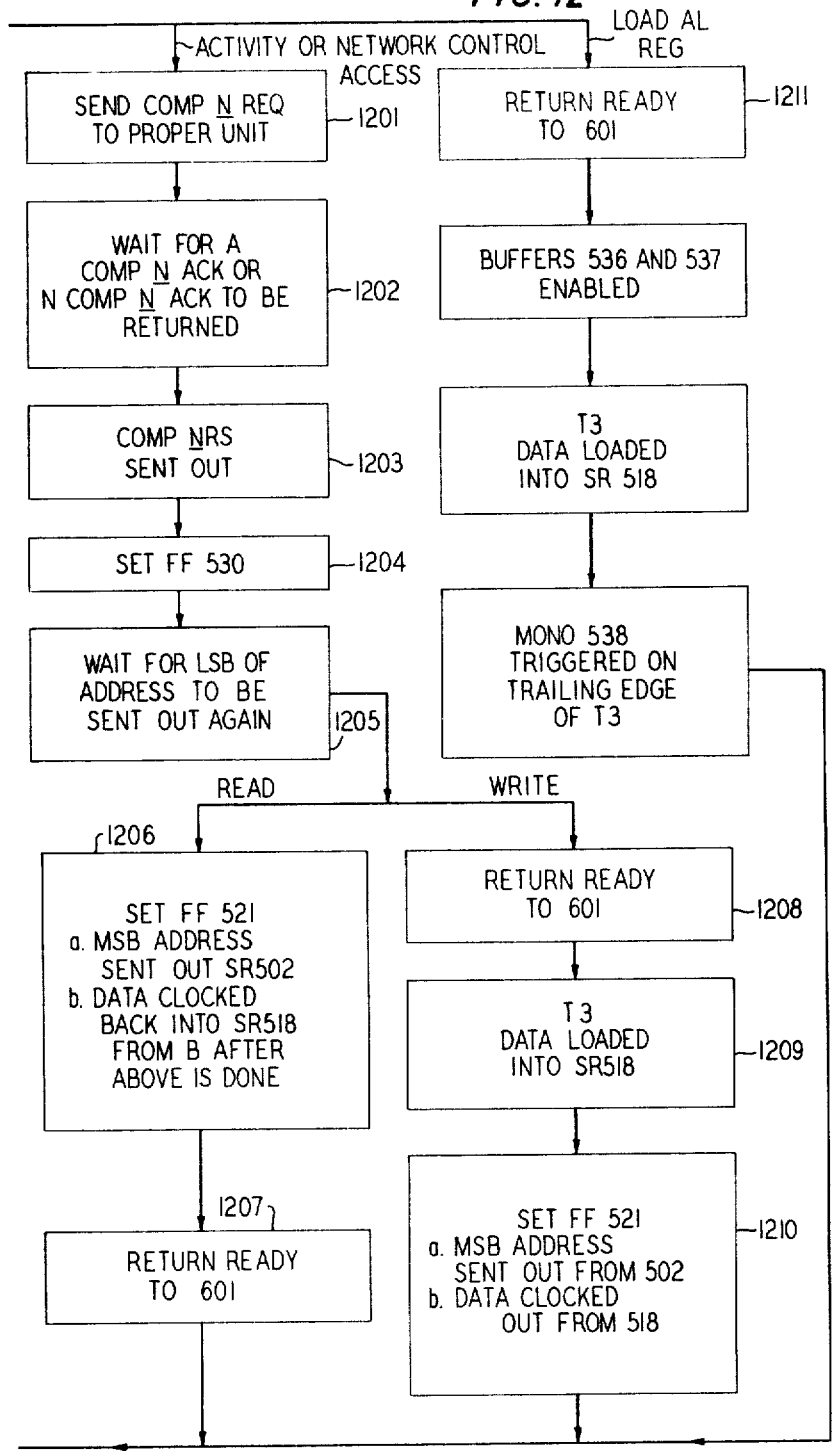
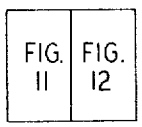
FIG. 12
FIG. 13

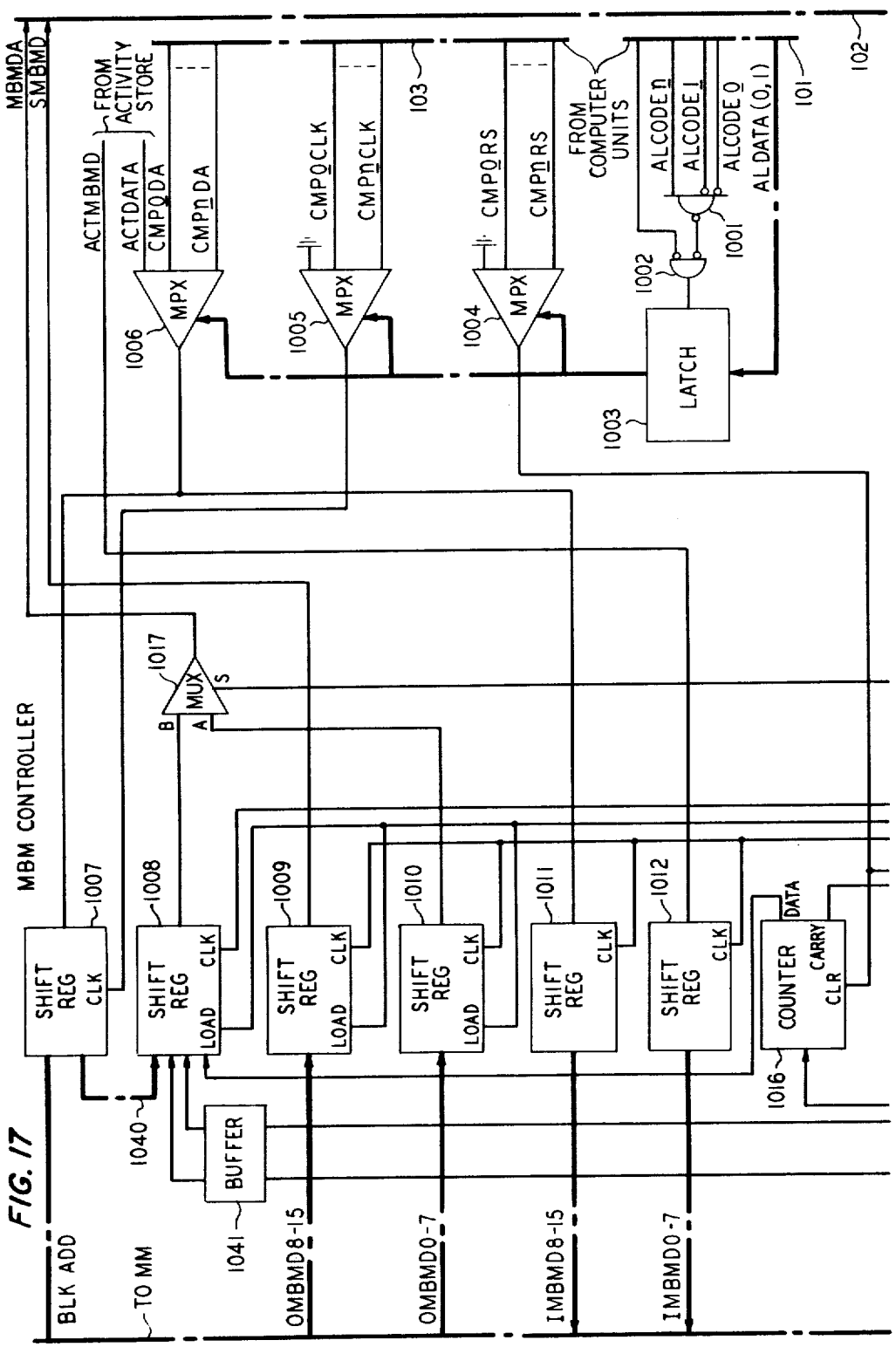

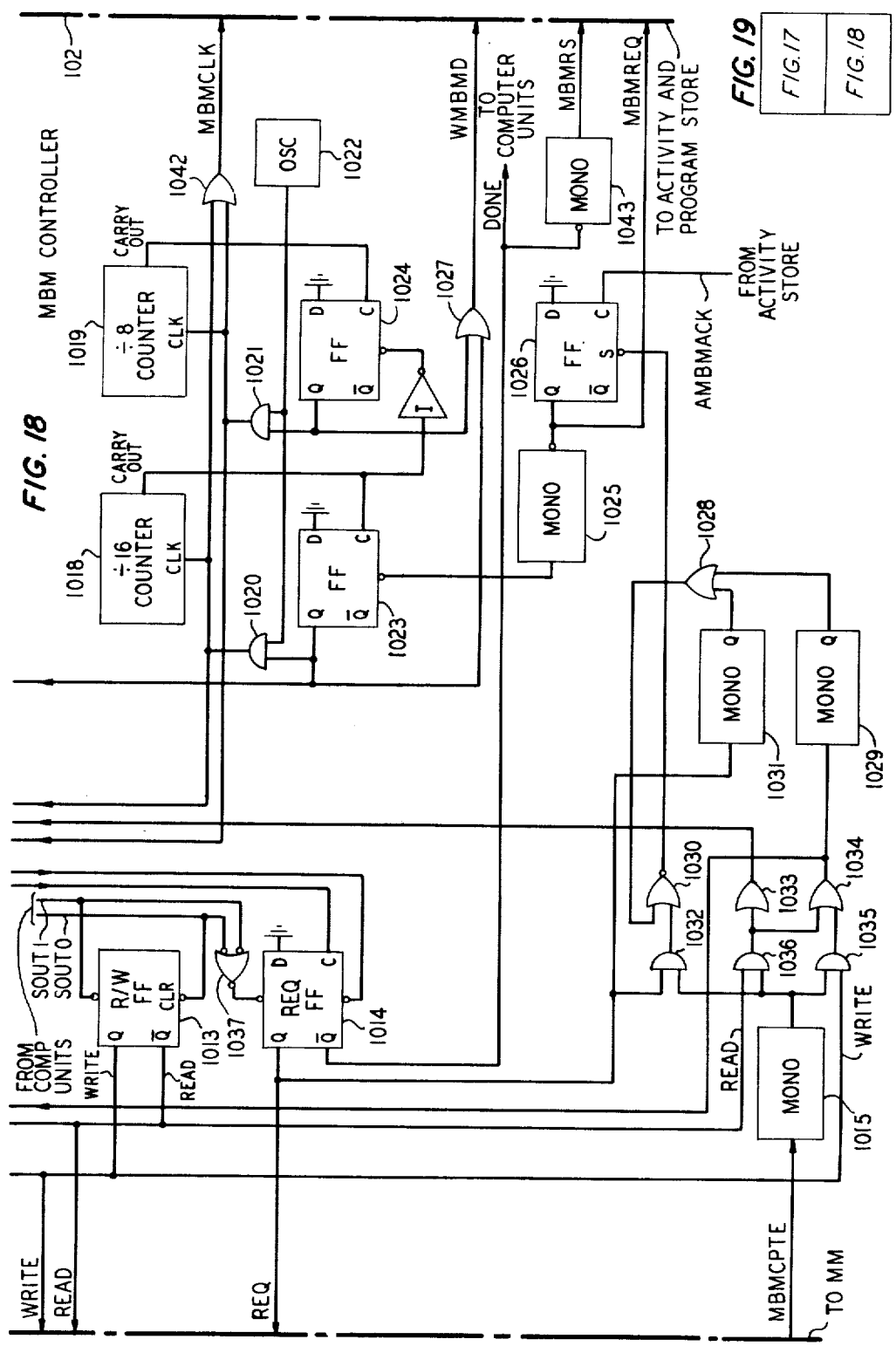

MULTIPROCESSOR SYSTEM WITH DEMAND ASSIGNABLE PROGRAM PAGING STORES

TECHNICAL FIELD

This invention relates to data processing systems and, more particularly, to such systems employing a plurality of independently operating computer units or processors.

BACKGROUND OF THE INVENTION

In the prior art U.S. Pat. to B. P. Ocshner No. 3,348,210 issued Oct. 17, 1967, a plurality of data processing units are connectable by a first switching network to a plurality of segments of permanent memory containing work program and to a permanent memory segment containing the administrative or task assignment routines. The last instruction of each work program points to the task assignment routine. The data processing units are also connectable by a second switching network to a plurality of writable operand memory segments containing data storage locations and, in the operand memory, the data processing units may access changeable task assignment words that contain pointers to the segments of the permanent memory containing programs to be executed. Each of the task assignment words contains a field (called an absolute enabling bit) to identify when that task word is active and a counter field (called conditional enabling bits) which is updated as each program is completed that must be executed as a prerequisite to making the task word active. When the counter field contains a full count, the absolute enabling bit makes the task word effective to designate that program in permanent memory which is next to be executed. The efficient functioning of the Ochsner arrangement thus requires the use of a segmented random access memory unit where each segment is dedicated to a particular program, a practice that is not efficient if the program is not frequently to be executed. If a particular memory segment becomes defective, that program can no longer be executed.

Further, while segmentation of the memory allows each of the Ochsner data processors to access a different memory segment, two data processors cannot simultaneously access the same memory segment. However, some real time control operations, such as digit collection in telephone switching applications may be required to be performed on a simultaneous basis so that two or more calls can be processed through the switching network at the same time. The Ochsner arrangement would require a number of duplicate memory segments to be dedicated equal to the maximum number of simultaneous calls that the system was designed to accommodate, even though, under light traffic conditions, less than all of such segments would be needed.

In addition to the Ochsner type of segmented memory system there are a number of other types of memory arrangements. In one of these arrangements a program segment called a page may be temporarily read from the main memory unit and written into a local cache memory unit. A cache memory unit is normally used only when the data processor's cycle time is less than the main memory unit's cycle time. The cache memory, which normally would have a faster overall access time than the main memory unit (perhaps 80–150 nanoseconds as compared to one microsecond for a 1 to 2 megabyte size memory unit), is particularly efficient in programming applications where the page of program will be repetitively exercised. Where the page is not repetitively used, the amount of time that the data processor must wait while the cache memory is being filled from the main memory may well counteract any savings in faster cache memory access time. Because practical considerations seem to rule out the requirement that the programmer must mark in advance those programs which should or should not be permitted to be paged into the cache memory at any instant of time, the likelihood of inefficient cache memory usage is present whenever an infrequently used program is paged into the cache memory. An example of prior art multiprocessor arrangement employing an individual cache memory permanently available to each data processing unit is shown in Parkin, U.S. Pat. No. 4,073,005, issued Feb. 7, 1978. In this arrangement any processor may page a desired program segment into its cache memory but must wait while the cache memory is being loaded before it can begin to execute the desired segment.

The recent past has seen great increases made in the intrinsic "power" of processor units. However, the use of high level programming languages has tended to offset the throughput benefit of the improvement in processor technology. Further, it would be advantageous to have a data processing arrangement where the processing power was not circumscribed by waiting time limitations.

SUMMARY OF THE INVENTION

According to an aspect of the invention, a data processing system includes a plurality of stored-program controllable computer units, a main memory unit, an activity memory, and a plurality of cache stores greater in number than the number of computer units which at any time may be simultaneously engaged in executing the programs. Each computer unit, incident to completing the execution of a program in a temporarily assigned one of the cache stores, is connected to the activity memory and thereafter causes the main memory unit to commence loading that cache store with a program to be executed by that one of the computer units which next becomes available to process new work. The first-mentioned computer unit then seizes for use a cache store which was caused to be loaded from the main memory unit by some other processor and then proceeds to execute the tasks under control of the program in that cache store.

The invention may find advantageous application in connection with a call processing arrangement such as that disclosed in Hight et al U.S. Pat. No. 3,908,092 issued Sept. 23, 1975 entitled, "Program Controlled Switching Systems," in which call processing has been broken up into short routines identified by call status words. Each status word corresponds to a call state, e.g., dial state or talk state. The call processing strategy assumes that there are only a fixed number of call states which can be served. In such a call processing arrangement, this number is equal to the number of time slots. Each state is sequentially served. In accordance with that aspect of my invention involving the application of a plurality of stored-program controllable computer units, sometimes hereinafter also referred to as processors, to the call processing arrangement of the aforementioned '092 patent, each processor is permitted to work on a call state pertaining to a particular telephone call independently of all other processors so that each telephone call is an independent entity whose only relationship to other calls is the bidding for common resources. If there are four processors, each processor can be working simultaneously on a different call. Whether there are four processors or one processor, the processing scheme handles each call sequentially and "knows" which status will be required, since the call to be served next is known. In the case of multiple processors, multiple calls are handled simultaneously; but the next sequential call which must be processed is still known. The present invention extends use of the prior art call processing arrangement by facilitating the mass memory which contains all the status routines. As required to process a call, status routines are loaded from the mass memory into smaller buffer/cache memories. In a given system, there is one more cache memory than the number of processors. The status routine for the next call is loaded from the mass memory into the free cache memory.

DESCRIPTION OF THE DRAWING

In the drawing:

FIGS. 4 and 5, taken together as shown in FIG. 6, are a detailed drawing of the activity store;

FIGS. 7, 8 and 9, taken together as shown in FIG. 10, are a detailed drawing of an illustrative one of the prior art computer units modified for use in my invention;

FIGS. 11 and 12, arranged as shown in FIG. 13 show flow charts of the modified operation of one of the processors;

FIGS. 17 and 18, arranged as shown in FIG. 19, are a detailed drawing of the main memory unit controller;

GENERAL DESCRIPTION

Figure 1:
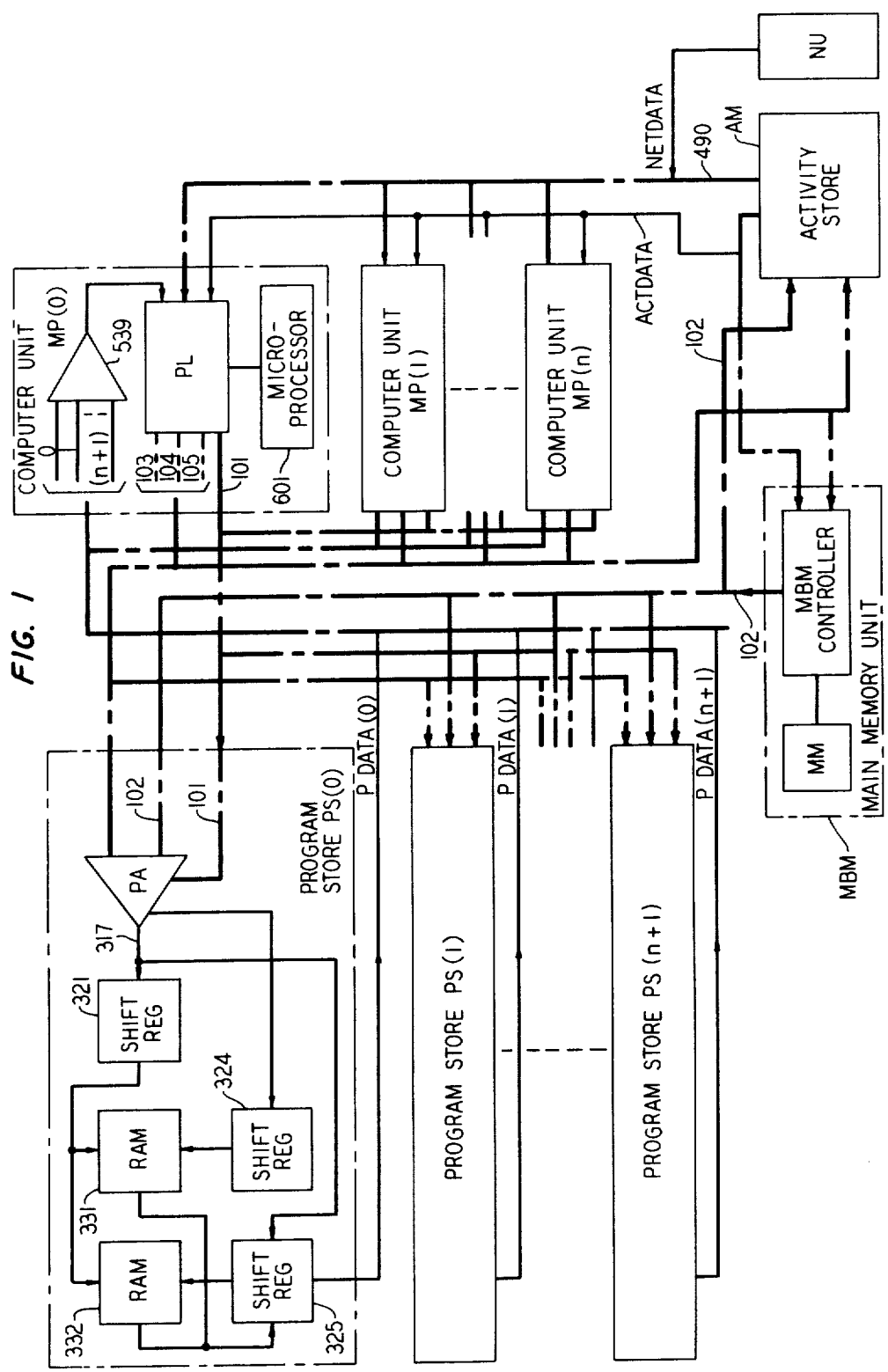
FIG. 1 is a block diagram illustrating an embodiment of a data processing system according to my invention and including a plurality of data processors and cache stores, a main and an activity memory unit and a switching network that advantageously may be controlled by the data processing system.

FIG. 1 is a block diagram of a multiprocessor system which has a plurality of program cache stores $PS_{(0)}$ through $PS_{(n+1)}$, and a lesser plurality of computer units $MP_{(o)}$ through $MP_{(n)}$. In addition, there is a main memory unit MBM which, advantageously, may be any sort of mass memory such as a magnetic bubble memory, an activity store AM, and a network unit NU such as private branch exchange telephone switching system in which a number of calls are in progress or are in process of being completed under the control of the data processing system of my invention.

The program stores $PS_{(o)}$ through $PS_{(n+1)}$ and the activity stores AM each illustratively have a capacity sufficient to contain 512 eight-bit words. As one of the program stores becomes idle, it is loaded from the main memory MBM with a program to be executed by the next one of the computer units that becomes idle, as will be described hereinafter in detail. Program stores $PS_{(o)}$ through $PS_{(n+1)}$ are identical except with respect to their individual address codes. An illustrative program store such as store $PS_{(o)}$ (which is shown detailed in FIG. 3) contains two random access memory (RAM) units 332 and 331 which can be addressed serially as either a 512×8 word memory or in parallel as a 256×16 word memory, depending on whether any one of the computer units $MP_{(o)}$ through $MP_{(n)}$ or the main memory unit MBM is writing into the store. Memory units 331 and 332 are advantageously static semiconductor RAM devices such as the Intel type 2102 unit. Any of the computer units $MP_{(o)}$ through $MP_{(n)}$ or the main memory unit MBM can transmit information to any of program stores $PS_{(o)}$ through $PS_{(n+1)}$. The illustrative program store also contains an access switch PA that receives control information over bus 101 and that selects the appropriate data and address information that is transmitted serially over bus 102. Bus 101 is common to the program store units $PS_{(o)}$ through $PS_{(n+1)}$, main memory unit MBM and processor units $MP_{(o)}$ through $MP_{(n)}$.

The main memory MBM of FIG. 1 (the control for which is shown detailed in FIGS. 17 and 18) may be used to load information into any program store unit or into activity store AM. The information to be loaded, and the unit to which it is to be loaded is determined by one of computer units $MP_{(o)}$ through $MP_{(n)}$ selecting the appropriate program stores access switch such as switch PA of program store $PS_{(o)}$ and transmitting the correct data and address information to the main memory MBM.

Computer units $MP_{(o)}$ through $MP_{(n)}$ are all identical and, by way of example, unit $MP_{(o)}$ will be described. The heart of computer unit $MP_{(o)}$ is the microprocessor 601 (also shown in FIG. 7) which advantageously may be of the integrated circuit "chip" type such as Intel type MCS 8008 or 8080. The computer unit also includes a read-only memory 8M (see FIG. 8) which is advantageously a 256×8 word memory that contains the basic administrative instructions such as the power-on sequence, etc. required by microprocessor 601. In addition, the computer unit includes peripheral logic PL (which is shown detailed in FIGS. 7 through 9), and which contains the circuitry to enable microprocessor 601 to communicate with the remaining units in the system.

The activity store AM to FIG. 1 (shown in detail in FIGS. 4 and 5) can be accessed by the main memory unit MBM or by any of the computer units, $MP_{(o)}$ through $MP_{(n)}$ but only one of such computer units can be working with the activity store unit at any time. The selection of which unit will be allowed to work with the activity store is determined in a somewhat different fashion than was the case with the program stores $PS_{(o)}$ through $PS_{(n+1)}$. The activity store scans leads in cables 102-105 leading to the main memory unit MBM and to computer units $MP_{(o)}$ through $MP_{(n)}$ in order to detect a requesting unit. Upon finding a unit requesting service, a control arrangement (435 through 447 shown in FIG. 5) within the activity memory allows that unit to obtain access. Normally, an accessing unit is only given priority for one memory cycle, however, as will be described later, when certain addresses are requested, the unit is allowed to have priority for more than one memory cycle. The necessary control information and data is returned to the requesting unit via an output decoder 434 (shown in FIG. 5).

The network unit NU of FIG. 1 which illustratively operates to set up telephone connections in a switching network, not shown, is accessed by computer units MP$_{(o)}$ through MP$_{(n)}$ in the same fashion as the activity store AM unit. Reference may be had to U.S. Pat. No. 3,908,092 issued Sept. 23, 1975, for an illustration of a time division switching network controlled by a single processor. It is an advantage of the present invention that different telephone calls assigned to respective time slots in network unit NU may be independently controlled by the plurality of the depicted computer units MP$_{(o)}$ through MP$_{(n)}$.

With the layout of the elements of FIG. 1, thus far understood, the operation thereof will now be explained. Consider that computer unit MP$_{(o)}$ is working with program store PS$_{(o)}$, that computer units MP$_{(1)}$ through MP$_{(n-1)}$ are working respectively with program stores PS$_{(1)}$ through PS$_{(n-1)}$ of group PS$_{(1)}$ through PS$_{(n)}$, and that computer unit MP$_{(n)}$ is working with program store PS$_{(n)}$ of group PS$_{(1)}$ through PS$_{(n)}$. The remaining program store PS$_{(n+1)}$ which is not presently assigned to work with any of the computer units is being loaded by main memory unit MBM.

Figure 2:
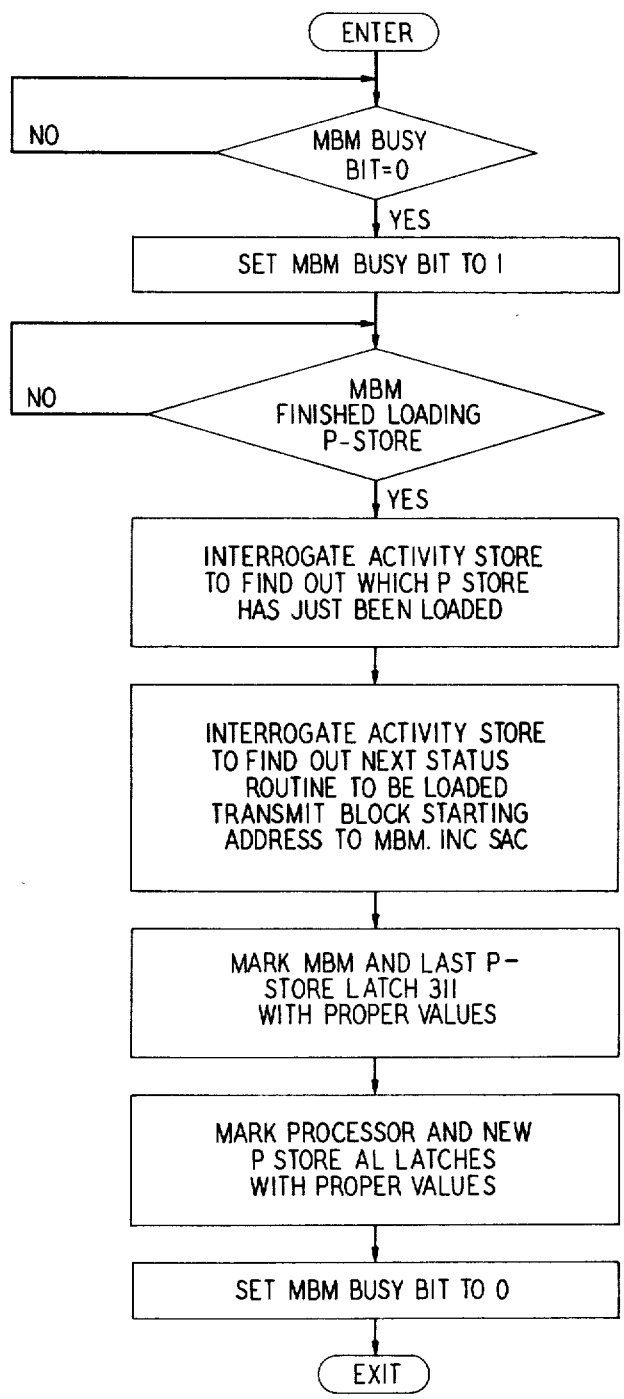
FIG. 2 is a flow chart of the process controlling the demand assignment of the plurality of cache stores.

Each of the computer units would normally be engaged in independently executing the program contained in its respectively assigned program store unit. The program in the respective program store will have previously been loaded or "paged" into that store from main memory unit MBM as follows: Assume that computer unit MP$_{(1)}$ is the first to finish executing its routine. Computer unit MP$_{(1)}$, under control of instructions advantageously stored in its read-only memory 8M (FIG. 8) then executes a program (see flow chart FIG. 2) which will cause it to test whether the main memory unit MBM has completed the loading of program store PS$_{(n+1)}$. When this occurs, computer unit MP$_{(1)}$ accesses the activity memory AM, first to find out which program store has been just loaded (i.e., program store PS$_{(n+1)}$, and then to obtain the slot address counter identifying the routine which is next to be loaded from main memory MBM into program store PS$_{(1)}$ which computer unit MP$_{(1)}$ has just completed using. Under control of read-only memory 8M, computer unit MP$_{(1)}$ transmits to main memory MBM both the contents of the pointer obtained from the activity memory AM as well as the information that the main memory unit is to load program store PS$_{(1)}$. Computer unit MP$_{(1)}$ then marks program store PS$_{(1)}$ so that it will accept information from the main memory unit. Computer unit MP$_{(1)}$ then starts to process the status routine which had previously been loaded into program store PS$_{(n+1)}$.

It should be noted that at the start of this description of the operation of the circuitry of FIG. 1, each of the computers MP$_{(o)}$ through MP$_{(n)}$ was working with a correspondingly numbered one of the program stores PS$_{(o)}$ through PS$_{(n)}$ while, at the conclusion of the discussion, computer MP$_{(1)}$ is no longer working with the correspondingly numbered program store PS$_{(1)}$, but is in fact working with program store PS$_{(n+1)}$. Further, while program store PS$_{(n+1)}$ was being loaded, none of computers MP$_{(o)}$ through MP$_{(n)}$ was kept waiting. Accordingly, regardless of the length of the status routine indexed by the pointer obtained from activity memory AM, main memory readout time does not detract from the speed of overall processor operation.

DETAILED DESCRIPTION

Figure 3:
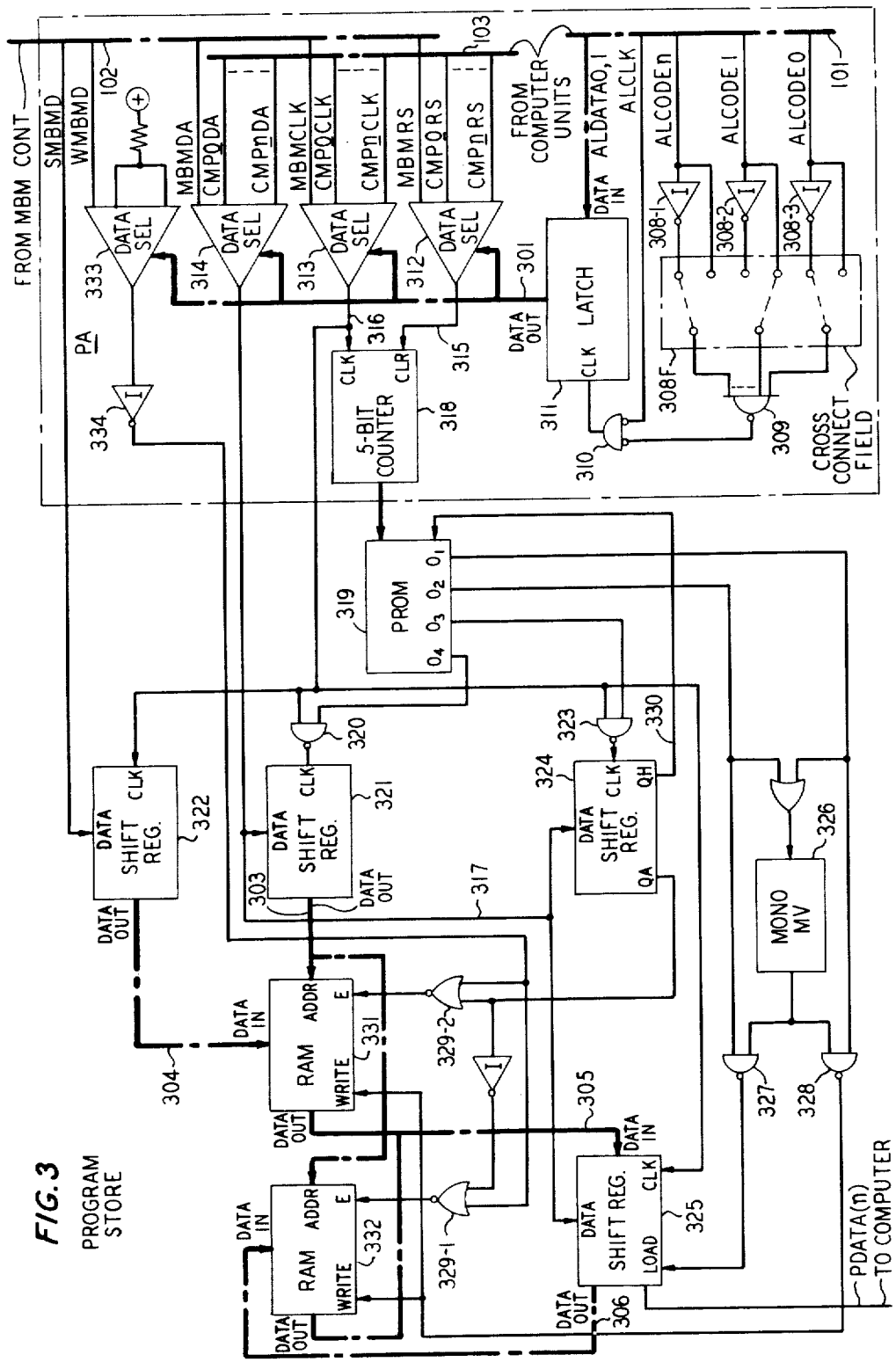
FIG. 3 is a detailed drawing of one of the program cache stores.

Program Cache Store (FIG. 3)

An illustrative one of program stores PS$_{(o)}$ through PS$_{(n+1)}$ is detailed in FIG. 3. The illustrative program store includes an access switch PA that receives signals appearing on leads ALCODE0, ALCODE1, ALCODE2 of cable 101. The signals on these leads define access codes that identify a respective program store according to the pattern of wire connections made in cross-connection field 308F. Cross-connection field 308F is interposed at the inputs of gate 309 between inverters 308-1 through 308-3 and the leads of cable 101. When a clock signal appears on lead ALCLK of cable 101, gate 310 permits latch 311 to accept the data appearing on leads ALDATA0,1 of cable 101. The contents of latch 311 appear on cable 301 which controls data selectors 312, 313, 314 and 333.

When one of computers MP$_{(o)}$ through MP$_{(n)}$ requires to fetch a word from one of program store units PS$_{(o)}$ through PS$_{(n+1)}$, it sends a reset signal over a respective one of leads CMP0RS through CMPnRS that is received by data selector 312 and applied by it over conductor 315 to the clear input of counter 318. The clock pulses provided by the same computer will be applied to one of leads CMP0CLK through CMPnCLK to data selector 313 and by it to conductor 316 to the clock input of counter 318. After resetting counter 318 to zero, the computer unit transmits 16 bits of address and control information on one of leads CMP0DA through CMPnDA to data selector 314 which applies the information to lead 317. The outputs of counter 318, appearing on cable 307, control programmable read-only (PROM) memory 319. Table I, appended hereto, shows the patterns of output codes appearing at terminals O$_1$, O$_2$, O$_3$ and O$_4$ of read-only memory 319. The output codes produced by memory 319 cause the first eight bits of address information appearing on lead 317 to be clocked into shift register 321 and the next eight bits of address information to be clocked into shift register 324.

Counter 318 supplies the five least significant bits to programmable read-only memory 319. The most significant bit is brought in on conductor 330 from the most significant bit position of shift register 324. The most significant bit (0 or 1) is a read/write control bit and will be further described. If the computer unit wants to read the memory of the program store, the most significant bit which appears on conductor 330 will be a "0". Both memories 331 and 332 have, in the meantime, been addressed by the lower eight address bits appearing on cable 303 at the output of shift register 321. When 16 clock pulses have been received on lead 316, the signal on output O$_2$ of programmable read-only memory 319 will be a "1" (See Table I), and monostable 326 will be triggered. The triggering of monostable 326 causes the addressed word of either random-access memory 331 or 332 to be loaded into shift register 325 depending on the signal appearing at the QA output of shift register 324 which controls gates 329-1 and 329-2.

If the accessing computer desires to write into the memory of the program store, the signal appearing on lead 330 will be a "1". The computer unit will send out eight more clock pulses on lead 316 and eight more data pulses on lead 317 thereby loading the data into shift register 325. At the end of the eighth one of these clock pulses, (See Table I), the O$_1$ output of programmable read-only memory 319 will be a "1". This will cause monostable 326 to be triggered, in turn causing gate 328 to enable the "write" inputs of both memories 332 and 331, one of which has been selected as determined by QA output of shift register 324.

When program store memories 332 and 331 are to be written from the main memory unit MBM, the operation is similar to the writing operation performed by a computer unit, with the exception that data is loaded into shift register 325 from lead MBMDA via data selector 314 and lead 317 and, in addition, shift register 322 is loaded from signals appearing on lead SMBMD (which carries the most significant eight bits of the 16-bit word coming from the main memory unit). The contents of shift register 322 are loaded into memory 331, and the contents of shift register 325 are loaded into memory 322. Since data is being simultaneously loaded into both memories 332 and 331, half the amount of time is required to transmit data into these memories from the main memory unit.

Activity Store (FIGS. 4 and 5)

A detailed block diagram of Activity Store AM is shown in FIGS. 4 and 5. The functions of elements designated 401 through 433 are identical to elements 301 through 333 just described with respect to a typical one of the program store units, with the exception that, in FIGS. 4 and 5, there are no elements corresponding to elements 308, 309, 310 and 311. The functions of elements 434 through 451 will now be described.

The normal mode of operation is for data access switch 435 to scan the CMPoREQ through CMPnREQ leads of cable 103 or cable 102 under control of counter 441 in step with signals selectively applied from local oscillator 436. Requests may be received over cable 103 from either a computer unit or the main memory unit. If there is no main memory unit request, lead MBMREQ will be in the high signal state and gate 437 will periodically apply an enabling signal to one of the three inputs of AND gate 447. Assuming for the moment that the output of timer 448 is high, another of the three inputs of gate 447 is thereby enabled. Data access switch 435 will apply a low signal to the D input of flip-flop 438 until a requesting one of leads CMPoREQ through CMPnREQ is found. A high signal will appear at the $\overline{Q}$ output of flip-flop 438 in step with the signals from oscillator 436, and gate 447 will be fully enabled to advance counter 441. The output of counter 441 will cause data selector 435 to scan the request signals coming from the computer units and the main memory unit MBM. When an access-requesting lead is found (a low signal condition), a high signal will be applied by access switch 435 to the D input of flip-flop 438. A low signal thereupon appears at the $\overline{Q}$ output of flip-flop 438, thereby preventing counter 441 from advancing. The signal at the Q output of flip-flop 438 causes monostable 439 to trigger which, in turn, causes decoder 434 to transmit an acknowledgment signal to the unit requesting service. The requesting unit then proceeds to write or read the memory elements 432 and 431 as was described in the case of the program store unit of FIG. 3. If the requesting unit is writing into memory elements 432 or 431, the output of inverter gate 446 will become active causing monostable 449 to be triggered. This will cause the $\overline{Q}$ output of monostable 449 to go low which will reset flip-flop 438.

In normal operation, counter 441 will be stepped so as to maintain access switch 435 scanning for requests. When access is granted to a requesting unit, priority is given normally only for one memory cycle. There are certain addresses, however, which, if requested, permit the unit to have priority for more than one memory cycle. Thus, if the inputs to decoder gate 451 are energized by shift register 424 in a pattern to indicate a predetermined address block, timer 448 will stop the advancement of counter 441 for a predetermined length of time to allow the main memory unit busy bit to be interrogated and set which requires the computer unit to execute more than one instruction. When timer 448 disables the advancement of counter 441, no other computer unit can gain access to the activity store.

If the accessing unit requests a read operation, the output of gate 427 activates timer 450 to time for the duration of eight clock pulses supplied to conductor 416 by the accessing unit. At the end of this interval, timer 450 will trigger one-shot 449, initiating the procedure just described for a write operation.

If the requesting unit is the main memory unit MBM, a somewhat different procedure is followed. Assuming that the main memory unit is a serial device, it must gain access to the activity memory in a reasonably short time. Hence, the activity store, upon receipt of an access request from the main memory unit on lead MBMREQ, will finish serving the computer unit presently being served and will then immediately honor the request from the main memory unit. When lead MBMREQ is placed in the low signal (access-requesting) state, flip-flop 438 will not be clocked by oscillator 436. Instead, flip-flop 445 will be set, thereby disabling the output of counter 441 and causing gates 443 and 442 to jam-set all the data selectors 435, 412, 413, 414 and 433. Flip-flop 445 is reset in an identical manner to flip-flop 438.

Figure 20:
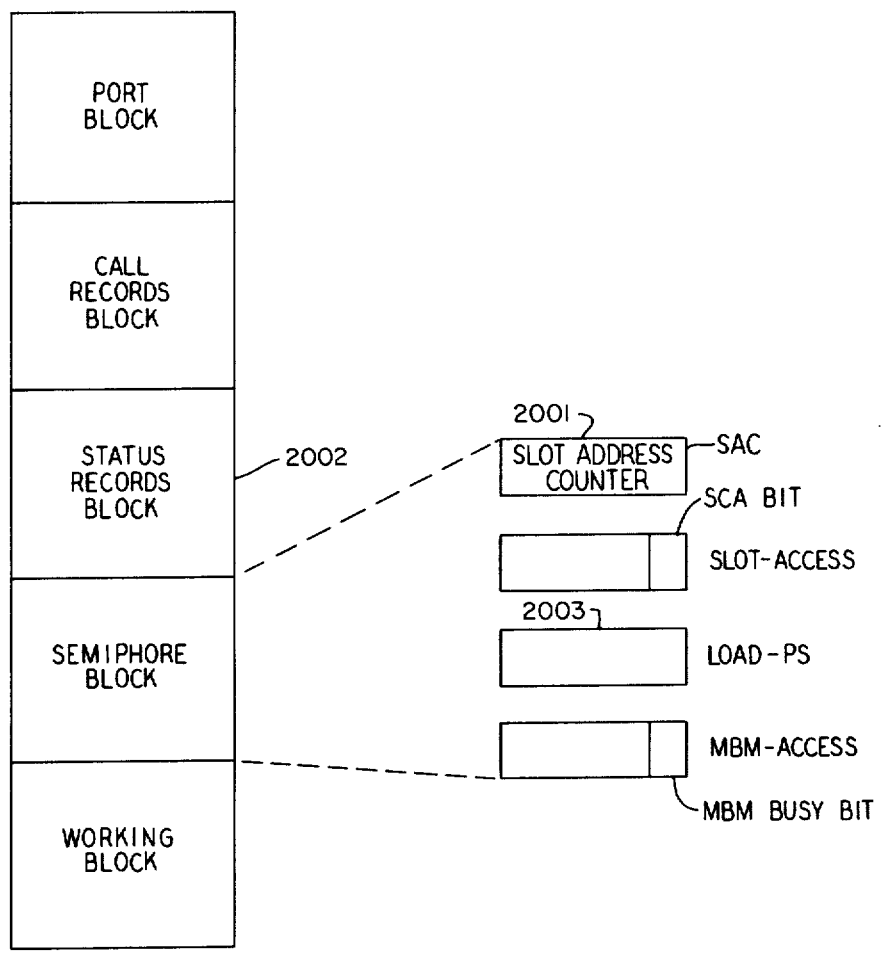
FIG. 20 shows a memory map of the activity store AM of FIGS. 4 and 5.
Figure 21:
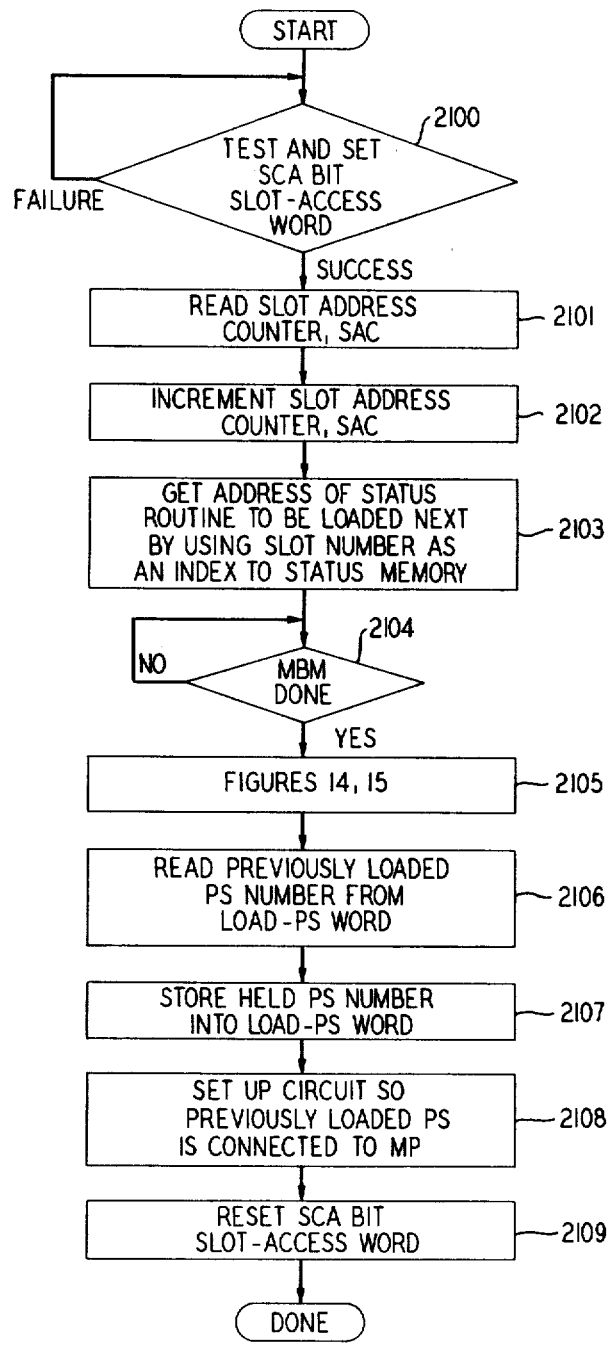
FIG. 21 shows a flow chart for the setting of control bits in the activity memory.

Memory Map FIG. 20 and Flowchart FIG. 21

FIG. 20 shows a memory map of the activity store AM, the circuitry for which has been shown in detail in FIGS. 4 and 5. The memory is divided into five principal blocks; the port block, call records block, status records block, semaphore block and working block. The port block stores information pertaining to each port in the telephone system arranged on a per port basis. In the aforementioned illustrative telephone switching system described in the '092 patent, a port is any of the telephones, trunks or multifrequency dial receivers. Access to information stored in the port block is arranged by indexing into this block using the number assigned to the port in question. Information stored at a particular address advantageously includes translation data and the switching status of the port. For example, the port data for a telephone would indicate whether the port was equipped with a multifrequency signaling dial or a conventional rotary dial and whether the port was presently marked busy or idle.

The call records block contains information particular to the call being serviced and is accessed by indexing with the time slot number assigned to the call, i.e., all calls assigned time slots in the network are listed in the call records block. Each call in the dialing state will have the dial digits collected in the corresponding time slot word of the call records block.

The status records block is also accessed by indexing with the time slot number and contains the address of the status routine in the mass memory presently serving that call.

The semaphore block permits a processor accessing the activity memory to perform a test and set operation. During the test and set operation, other processors cannot access the activity memory. The test and set operation allows the software to implement a semaphore in the semaphore block. In the expanded view of the semaphore block, the three types of words which this block advantageously contains have been shown in expanded size for convenience of labeling. Four such words are identified; namely, SLOT_ACCENT, LOAD-PS, SLOT ADDRESS COUNTER and MBM-ACCESS. A semaphore is implemented by the circuitry of FIGS. 4 and 5 beginning with the description of counter 441 which maintains access switch 435 scanning for requests and which counter is stopped for a predetermined length of time under certain circumstances to allow the main memory unit busy bit to be interrogated and set. The implementation of a semaphore is accomplished on the basis that the main memory unit busy bit must be tested and set by the accessing processor before any other processor can gain access to that bit. This is required in the case where multiple processors will be bidding for access to the same main memory unit, each of which would be trying to test the main memory unit busy bit which is located in the activity memory. If a processor accessing the activity memory finds the MBM busy bit set to idle, the accessing processor then marks the bit busy and may proceed on the assumption that it is the only processor accessing the main memory unit. A processor accessing the MBM busy bit in the activity memory must be capable of blocking the other processors from accessing this bit for a sufficient amount of time to test the bit and set it as just described.

The function of the remaining words of the semaphore block may be explained in connection with the flowchart of FIG. 21. When a processor is ready to enter the start block shown at the top of the figure, the processor will have finished a call but must yet accomplish two more tasks. The first task is to cause the main memory unit to commence loading the memory of the program store unit with which the processor has just finished working. This program store unit, while in the "being-loaded" state, is, in effect, the spare program store unit for the system. The information which the main memory unit must load into this "spare" store is the program required to process the second call in the call sequence. The second task to be performed is to initialize the processor to be able to handle the first call in the call sequence. To accomplish these tasks, the processor must block other processors from executing the same sequence. The blocking is accomplished by accessing the SCA bit of the SLOT_ACCESS word. If the SCA bit is found to be "0", the processor, as indicated in block 2100, sets this bit to "1" and follows the "success" path. The semaphore action of the activity memory allows only one processor to execute block 2100 at any instant. If the SCA bit is found to be a "1", the processor follows the "failure" path and continues to retry until successful. In blocks 2101 and 2102, the processor accesses the slot address counter, obtains the next time slot number and increments the slot address counter SAC in the semaphore block (FIG. 20) in preparation for the next processor. Using the slot number just obtained, the processor in block 2103 indexes into the status records block of FIG. 20 and reads the address of the status routine in the main memory unit. If the main memory unit is idle (block 2104), the processor executes block 2105 to commence the transfer of the indicated routine from the main memory unit to the "spare program store". The processor has now completed the first of the aforementioned two tasks.

The processor now obtains the identification of the program store unit containing the status routine for the "first call" in the call sequence. The processor obtains this information by reading the LOAD_PS word (see FIG. 20) and executing block 2106 in FIG. 21. In block 2107, the processor writes into the LOAD_PS word the number of the "spare" program store unit. In block 2108, the processor connects itself to the program store unit previously indicated by reference to FIG. 20 and commences to execute the routine stored therein after resetting the SCA bit (block 2109), which permits another processor to execute the steps of FIG. 21.

The last block in the activity memory of FIG. 20 is the working block memory which is allocated on a per processor basis, each processor having a portion of this block assigned to it for use as a scratch pad memory.

Figure 8:
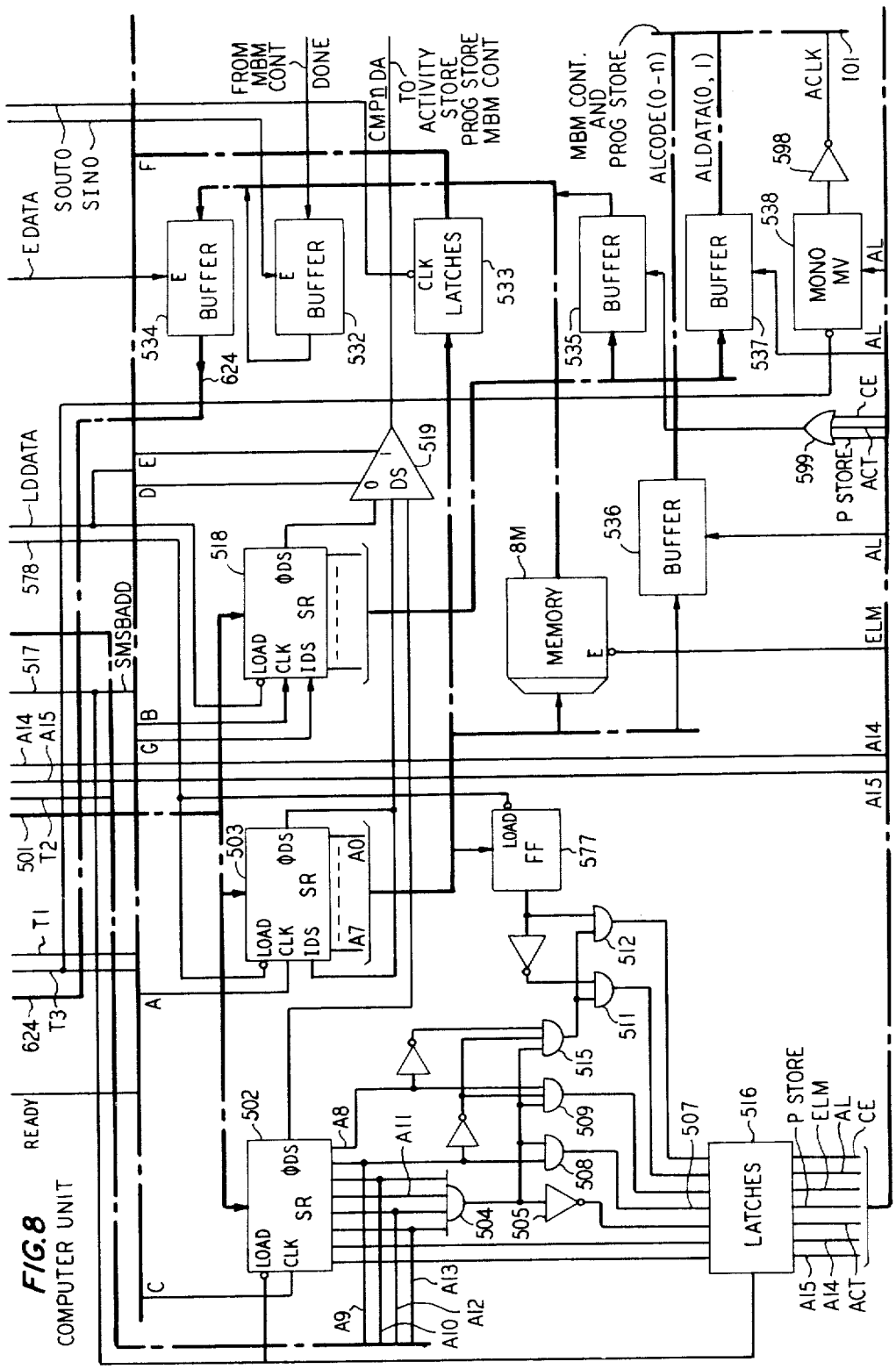
Figure 9:
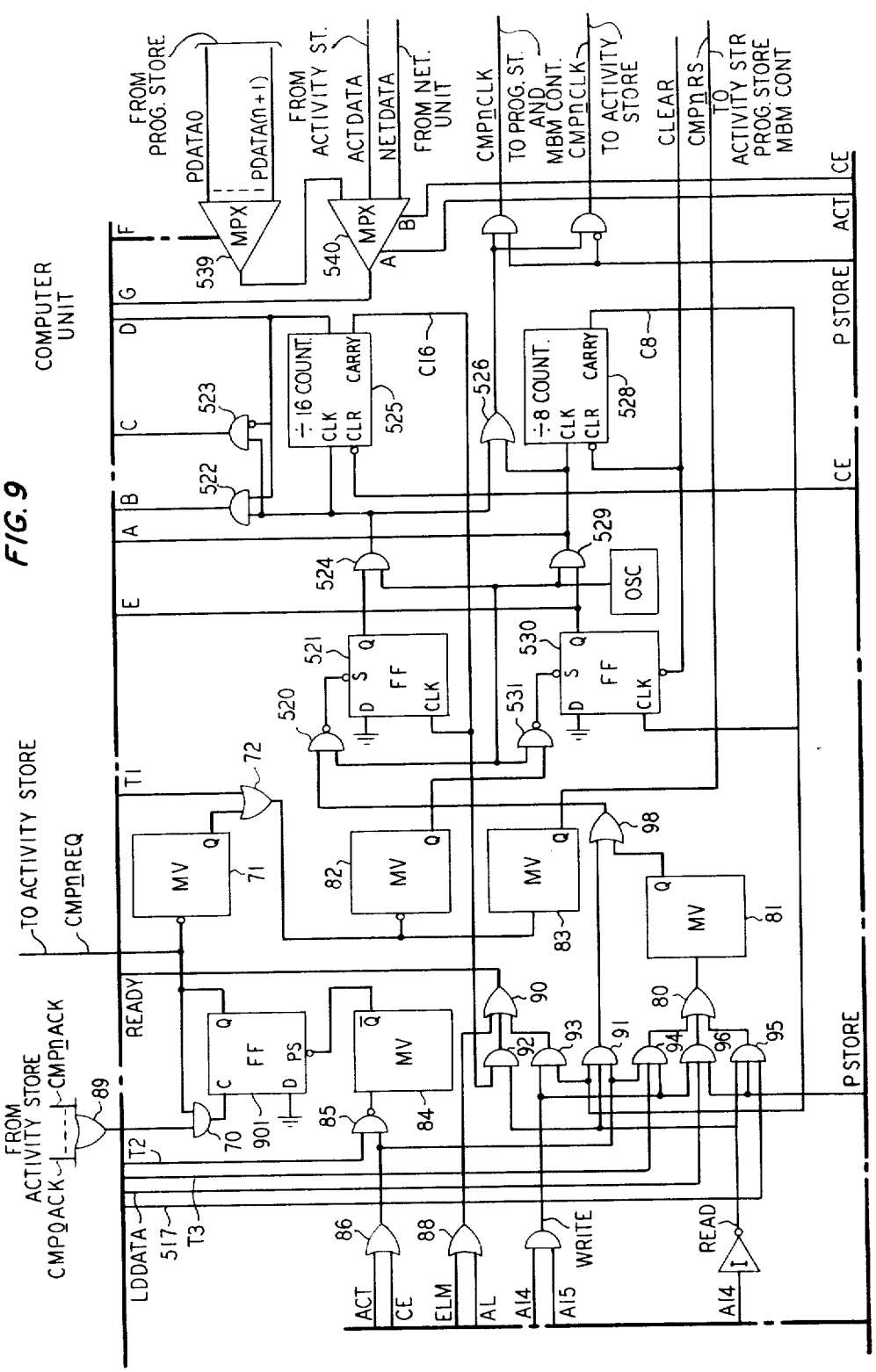

Computer Unit (FIGS. 7, 8 and 9)

The detailed block diagram for the computer unit is given on FIGS. 7, 8 and 9. As previously mentioned, each computer unit contains components including a microprocessor 601, FIG. 7, a random access memory unit 8M, FIG. 8, and control logic 602 through 620 FIG. 7 which advantageously may be of a type similar to the well-known MCS-8 TM parallel 8-bit microcomputer manufactured by Intel Corporation and described in their November 1973 publication entitled, "8008, 8-bit Parallel Central Processor Unit, User's Manual" in which particular elements of FIGS. 7 and 8 hereof may also be found in FIG. 10 at pp. 26-27 of the aforementioned User's Manual. Microprocessor 601 in FIG. 7 corresponds to the "8008" single chip MOS parallel central processing unit in the aforementioned publication.

Processor 601 communicates over an 8-bit data and address bus 603 (identified as leads $D_0$ through $D_7$ in the Intel 8008 unit), uses two input leads (of which only the READY lead is shown in FIG. 7) and four output leads $S_0$, $S_1$, $S_2$ and SYNC for control. The data registers, accumulator, temporary registers, flag bit flip-flops, and binary arithmetic unit internal to microprocessor 601 are not shown, but these and the remaining detailed circuitry shown and described in the aforementioned User's Manual are, however, incorporated herein by reference to the extent necessary to familiarize the reader with the background prior art processor and with the environment in which my invention functions.

Data and address information is transmitted from buffer 602, FIG. 7, to any of shift registers 502, 503 or 518, FIG. 8, via bus 501 which consists of eight conductors. Shift register 503 is enabled by the receipt of a load signal on conductor 578 to store the information which appears on bus 501 as the lower eight bits of the address. When the eight most significant bits of the address appear on bus 501, they are stored in register 502 which is enabled by the appearance of a load signal on conductor 517. The signal on conductor 517 is a low active signal which clocks information into shift register 502 on its negative-going edge.

The output of shift registers 502 and 503 is transmitted to latches 516 via gates 504, 508, 509, 515, 511, and 512, on the negative-to-positive edge of the "load" signal on conductor 517. The five lower order bits of latches 516 define which unit is to be written into or read from by the particular instruction and the two most significant bits (A14, A15) define the type of operation to be performed. The decoding functions severally performed by gates 504 through 515 are defined in Table II.

As is well-known, an instruction for a microprocessor of the aforementioned type may be executed in one or more cycles, each cycle of which includes a variable number of states. The different types of cycles are shown in Table IV, and the different states are shown in Table V. In state T1, the lower eight bits of the address are sent out over bus 501 to register 503. In state T2, the high order six bits of address and two bits of control are sent out to register 502. The two bits of control define the type of cycle. In a PCI cycle which designates than an instruction is to be fetched from memory, microprocessor 601 pauses after state T2 ("WAIT") until the memory system activates the ready lead via gate 90 of FIG. 9. Upon receipt of the READY signal, microprocessor 601 executes state T3, in which it reads the instruction appearing on leads $D_0$ through $D_7$ of bilateral data bus 603 from buffer 534 via cable 624 from buffer 534 of FIG. 8. Whether microprocessor 601 will execute states T4 and T5 depends upon the instruction fetched. The instruction may require that more cycles be taken.

The microprocessor states are defined by outputs $S_0$, $S_1$, and $S_2$ of cable 604 and the microprocessor activates the SYNC lead to allow the external logic to become synchronized with its operation. Oscillator 605 generates the $\phi 1$ and $\phi 2$ signals which are the clock inputs for microprocessor 601.

If the information on bus 501 at the output of buffer 602 is to be jam-set into shift register 503, FIG. 8, the signal on lead 578 at the output of gate 614 will be true. Register 503 receives the eight least significant bits of the address. The output of gate 614 will be true when either state T1 or TI1 is true and conductor 631 is high. The signal on conductor 631 is generated by gates 606 through 609.

If the data on bus 501 is to be jam-set into shift register 502, the signal on lead 517 at the output of NAND gate 612 will be low. Register 502 receives the two control bits and the six most significant bits of the address. The output of NAND gate 612 is low when conductor 631 is high and the state is T2.

The signal on lead EDATA at the output of gate 622 defines when buffer 534, which controls bus 624 in FIG. 8, should be enabled. At this time, microprocessor 601 will read bus 603. Gate 621 decodes when the cycle code, as defined by Table IV, designates that microprocessor 601 will be reading data. If either lead A14 or A15 at the output of latches 516 is low, cycles PCI, PCR, and PCC are defined, but the output of gate 621 will be low for the PCW cycle. The state of lead T3A, at the upper input of gate 622 defines when, during the cycle, the data in buffer 534 should be enabled onto bus 624 and, in turn, onto bus 603. The function of lead $\overline{T3A}$ and certain of the other important leads of FIG. 7 are summarized in Table III.

The internal timing of microprocessor 601 makes it necessary to anticipate the T3 state when reading data from bus 603. This is done by setting flip-flop 620 at the very end of T2 and resetting flip-flop 620 half-way through the T3 cycle. The actual timing is accomplished by flip-flop 620, gate 619 and gate 618.

The signal on lead LDDATA at the output of flip-flop 616, defines when, during a PCW cycle, the information on bus 603 is to be written via buffer 602 and bus 501 into shift register 518, FIG. 8. Flip-flop 616 is set by gate 617, inputs A14 and A15 of which, in the high state, define that the PCW cycle is being executed. The positive going transition on conductor 631 will reset flip-flop 616. Data then is valid on bus 603 to be written into a memory or into the appropriate register, 502, 503 or 518.

Consider now the processing of input/output, (I/O) instructions. An output instruction makes the contents of microprocessor internal register "A" (not shown) available to be output on bus 603. An output instruction has two fields, one conventionally termed the RR field which is controlled by the signal on leads A12 and A13, and the other conventionally termed the MM field. The MM field is three binary bits in length and designates the peripheral device that is to receive the output. The output instruction executes a PCI cycle to fetch the actual instruction. When the PC cycle is thereafter executed, the contents of the processor's internal "A" register is first transmitted during the T1 state followed, during the T2 state, by the actual instruction itself. The two most significant bits of the instruction are 01 which is the code for the PC cycle. The data which is output during states T1 and T2 is saved in shift registers 502 and 503 of FIG. 8. Decoder 625 of FIG. 7, when strobed with the output of gate 627, decodes the signals on leads A9 and A10 which are the two least significant bits of the MM field. The output of gate 627 is high when the T3A signal is present and leads A12 and A13 (which are the RR field) are each "1". Gate 629 detects the code for the PC cycle. These four inputs are ANDed together by gate 627 to provide the strobe for decoder 625. During an output instruction, the signal on lead SOUTO clocks the data contained in shift register 503 into latches 533.

The input instruction is similar to the output instruction with respect to the T1 and T2 states. However, the data is actually read during the T3 state from bus 603. Data must be loaded onto bus 603 in anticipation of state T3 under control of the signal on lead EDATA. Decoder 624 provides the strobing signals for buffer 532 which buffer the data from the various devices. Gate 626 controls the strobing of decoder 624. The RR field A12 and A13 must both be zero for an input instruction to take place. An input instruction causes buffer 532 to be enabled which places data on the input of buffer 534. Buffer 534 is enabled by the signal on lead EDATA which allows processor 601 to read the data on bus 603.

Shift register 518 is the main data link between the various memories and peripheral units. Shift register 518 is loaded in parallel under control of flip-flop 616, FIG. 7. Shift register 518 is loaded serially by the clock signals applied on lead B from the output of gate 522 (FIG. 9). Serial data is provided on lead G by the output of multiplexer 540, FIG. 9.

The local memory 8M for processor 601 is enabled to deliver its contents to the input of buffer 534 by the signal on lead ELM provided by latches 516. Shift register 518 may output its contents to buffer 534 via buffer 535 which, in turn, is enabled by the output of OR gate 599. The inputs to OR gate 599 are provided on leads ACT, PSTORE and CE by the output of latches 516.

When the signal on lead AL at the output of latches 516 is true, indicating that the access switches of the program store (FIG. 3) or main memory controller (FIG. 17) are to be controlled, buffer 536 outputs address information on leads ALCODE(0,1). Monostable 538 outputs clock signals on lead ACLK, and buffer 537 outputs data information on leads ALDATA(0,1) to the program store units and to the main memory unit. Advantageously, the clock signal on lead ALCLK may be provided from an open collector buffer 598 when the signal on lead AL is true during the positive-to-negative transistion of the T3 state signal.

The selection of the serial data which is to be input into shift register 518 is determined by multiplexers 540 and 539, FIG. 9. Multiplexer 539 is addressed by the signals on cable F at the output of latches 533, FIG. 8. Multiplexer 539 selects the data on cables PDATA(o) through PDATA(n+1) from the correspondingly numbered program stores of FIG. 1. The actual data input into the IDS input of shift register 518 is selected by the G lead output of multiplexer 540, the addressing for which is determined by the signals on leads ACT and CE at the output of latches 516. When the signal on lead CE is true, data on lead NETDATA from the network control unit NU (FIG. 1) is supplied by multiplexer 540. At any given point in time, only one of leads ACT and CE can be active although both can be zero.

The contents of any of shift registers 502, 503, or 518 may be multiplexed out through data selector 519. When the data in shift register 503 is to be out-multiplexed, the signal at the Q output of monostable 82 (FIG. 9) is made true. This signal is ANDed by gate 531 to set flip-flop 530. The setting of flip-flop 530 allows eight clock pulses to flow through gate 529 to lead A to the clock input of shift register 503 before flip-flop 530 is reset by the carryout of counter 528. Data selector 519, FIG. 8, is set to select data on its center input (from shift register 503) since the signal on lead E from flip-flop 530 is a one and the signal on lead D from counter circuit 525 is a zero. The data being shifted out of shift register 503 at its terminal ODS is advantageously recycled back into the shift register at its IDS terminal.

When the contents of shift registers 502 and 518 are to be output, the output of gate 98, FIG. 9, is made high which causes flip-flop 521 to be set. Gate 524 will generate 16 counts before flip-flop 521 is reset via the carryout of counter 525. Under control of counter 525, the first eight clock pulses are applied to shift register 502 via gate 523 and lead C, and the next eight clock pulses are applied to shift register 518 via gate 522 and lead B. The D output of counter 525, FIG. 9, controls the input selection of data selector 519, FIG. 8.

Figure 11:
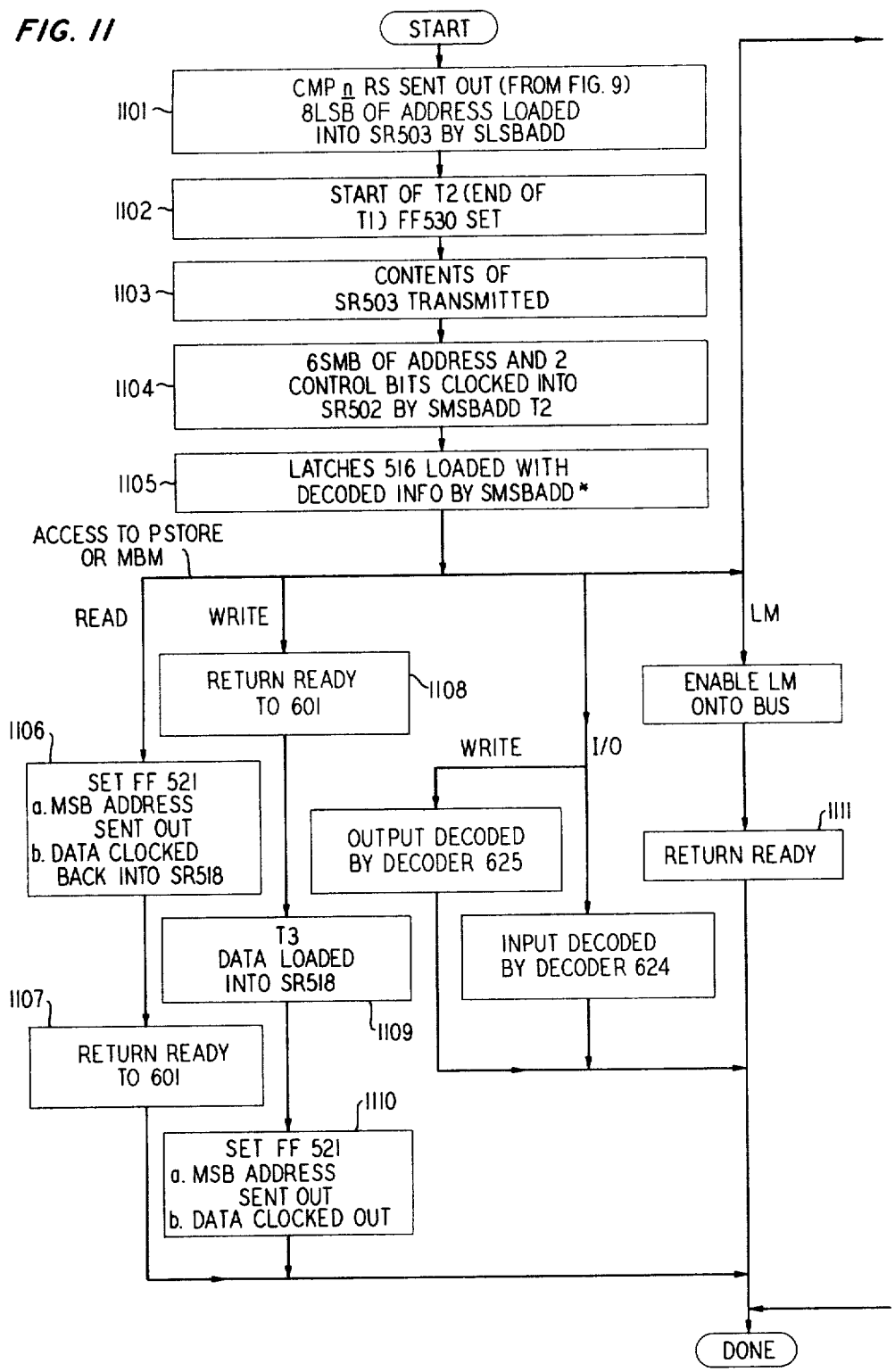

The Q output of flip-flop 901 at the left-hand side of FIG. 9 generates the signal on lead CMPnREQ, and via monostables 71 and 83 generates the signal on lead CMPnRS to implement the flowchart of FIGS. 11 and 12. When access is to be made to a program store, the low order address bits which are in shift register 503 are transmitted to the program store during the T2 cycle. If, after the eight high order instruction bits are fetched, the program store is not to be accessed, the data in shift register 503 is recirculated and, as shown in the flowchart of FIGS. 11 and 12, this data may be sent back out. The basic idea of the recirculation is that most access will be to a program store unit. If the access is not to a program store unit, then the low order address bits have been recycled into shift register 503 and are available to be shifted out to the proper memory.

In the flowchart of FIG. 11, the path for the I/O instruction is also shown for the sake of completeness since the I/O operations are not memory-accessed type operations. No control is required to reinitiate the processor or to give a return signal when giving an I/O instruction. The operation of gates 90 through 95 of FIG. 9 is also explained by the flowchart of FIGS. 11 and 12. In FIG. 11, block 1101 is implemented when T1 becomes true on the input of OR gate 72. This causes multivibrator 83 to output the CMPnRS pulse. In addition, block 1102 is implemented when the output of gate 72 goes low which causes multivibrator 82 to produce a pulse on its Q output. The pulse from multivibrator 82 activates gate 531 causing flip-flop 530 to be set. Blocks 1103 through 1105 are implemented by the previously described circuits.

When either a program store or the main memory unit is being accessed by a processor for a read operation, block 1106 is implemented by the inputs of gate 96 all being in the true state. This causes multivibrator 81 via gate 80 to produce a pulse on its Q output. This pulse passes through gates 98 and 520 and causes flip-flop 521 to be set.

Block 1107 is implemented by the inputs of gate 92 being made true, which causes the output of gate 92 to become true. The output of gate 92 being true causes the READY signal to be true via gate 90. If the operation is a write, the READY signal is returned by gate 93 via gate 90, as required by block 1108.

Block 1109 is implemented by previously described circuits. Block 1110 is implemented by the inputs to gate 95 being true, which causes the output of gate 95 to be true. The output of gate 95 being true causes a pulse to be emitted from the Q output of multivibrator 81, which in conjunction with gate 98 and 520, causes flip-flop 521 to be set.

If the Activity Memory or the Network Control is accessed, block 1201 must be implemented. If either the ACT or the CE signal is true, the output of gate 86 will be true. When gate 86 is true, the occurrence of T2 causes multivibrator 84 to produce a pulse on its $\overline{Q}$ output via gate 85. This pulse from multivibrator 84 causes flip-flop 901 to be set, which makes the CMPnREQ signal true. When the Activity Memory returns an ACOMPnACK signal to gate 89, flip-flop 901 causes multivibrator 71 to produce a pulse which causes multivibrators 82 and 83 to produce pulses in a sequential order, implementing blocks 1203 and 1204.

Block 1205 is implemented by previously described circuitry. If the operation is a read, block 1206 is implemented by gate 91 having its outputs true. With the output of gate 91 true, flip-flop 521 is set via gates 520 and gate 98. Block 1207 is implemented by gate 92 via gate 90.

If the operation is a write, then block 1208 is implemented by gates 93 and 90 as previously described. Block 1207 is implemented by previously described circuits. Block 1210 is implemented by gate 94, gate 80, and multivibrator 81. When the inputs to gate 94 are true, flip-flop 521 is set via gate 80, multivibrator 81, gate 98, and gate 520.

Blocks 1211 and 1111 are implemented by gate 88 via gate 90. The ELM signal, which is an input to gate 88, occurs during a read from memory 8M. The AL signal occurs during the loading of the AL registers.

MBM Controller (FIGS. 17 and 18)

Figure 14:
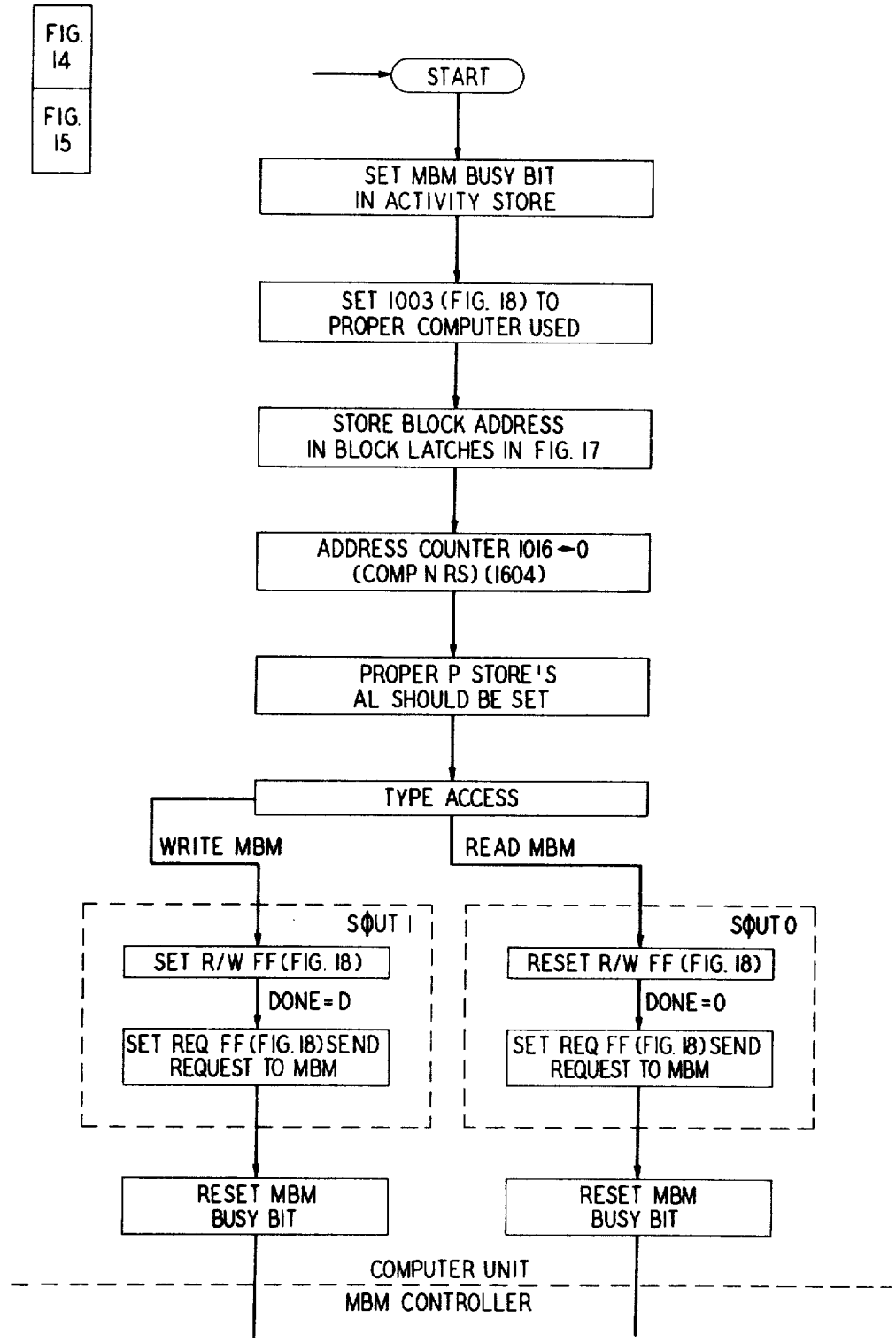
FIGS. 14 and 15, arranged as shown in FIG. 16, show flow charts of the operation of the main memory unit controller.
Figure 15:
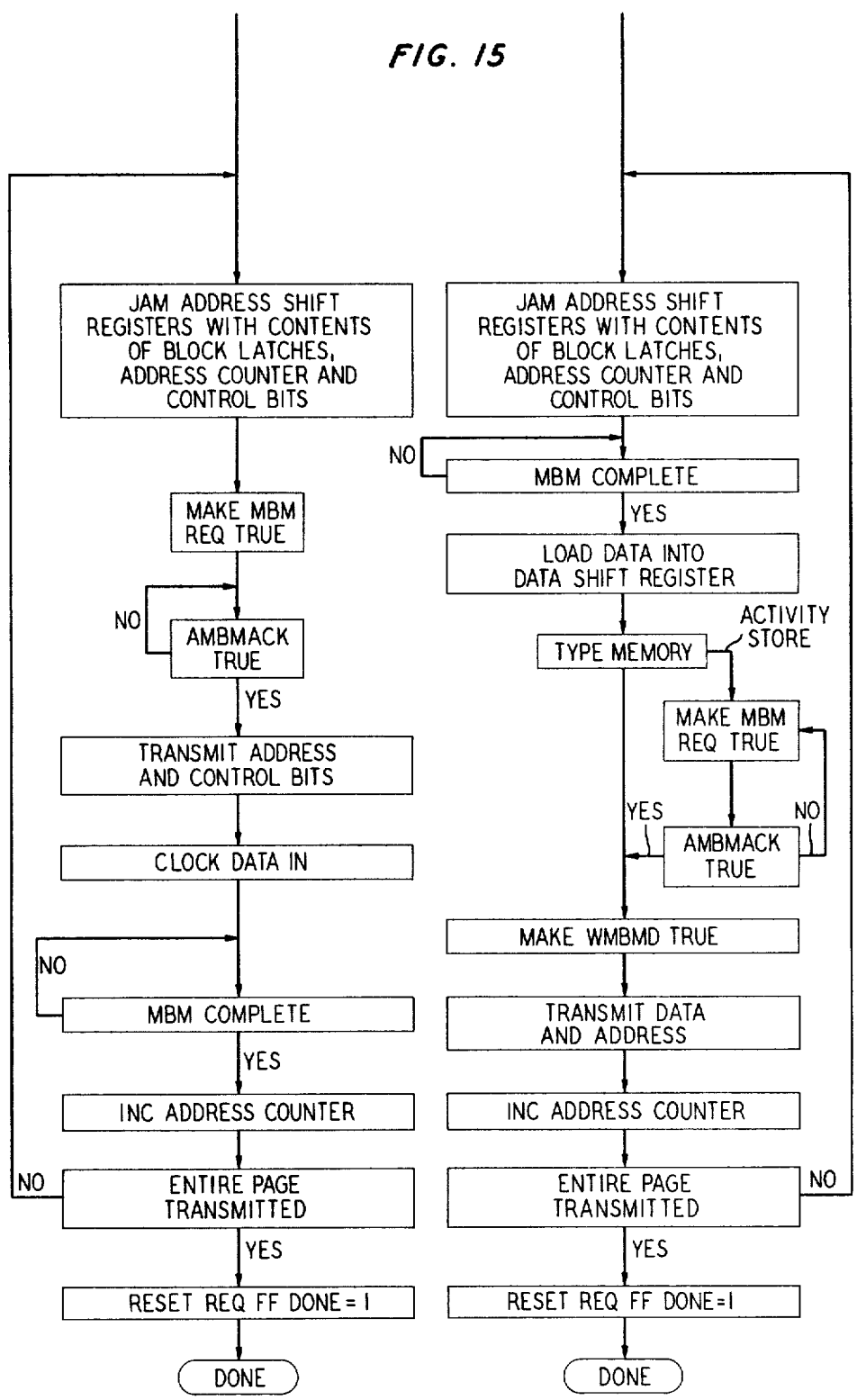

A flowchart of the MBM Controller is given in FIGS. 14 and 15 and a block diagram of the controller is given in FIGS. 17 and 18. It is assumed that, when the signal on leads REQ, FIG. 18, and on lead READ are true, the mass memory (not shown, but see *Electronic Design* 21, Oct. 11, 1978 at p. 28 for an example of a mass memory of the magnetic bubble type) will take the address information presented to it on the BLK ADD bus, FIG. 17, and fetch the data block addressed by this information. After it has fetched the first word, the mass memory MM will make the signal on lead MBMCPTE, FIG. 18, true and present the information on the OMBMD 8-15 and OMBMD 0-7 bus, FIG. 17. The mass memory unit MM will do this for each of the words in the address block. If the MBM controller is to write information into the mass memory MM, the signal on leads REQ and WRITE will be true, and the data to be written will be presented to the mass memory on the IMBMD 0-7 and IMBMD 8-15 buses, FIG. 17. After the mass memory unit has written the word into the address block, it will then make the signal on lead MBMCPTE, FIG. 18, true.

When a computer unit has determined that it must initiate a transfer to or from the main memory, it enters the MBM controller flowchart of FIG. 14, which flowchart details the actions taken by the MBM controller in response to a computer unit. The block address information is entered into shift register 1007, FIG. 17, from the output of multiplexer 1006 under the control of clocking signals provided by the output of multiplexer 1005. Shift register 1007 contains 24 bits of data, but only the 8 low order address bits and the 8 data bits as transmitted from the computer unit are used. These 16 bits are used for the BLK ADD bus information and for the information placed on BUS 1040 to shift register 1008. The address counter 1016 is cleared by the output of multiplexer 1004. Latch 1003 is loaded in the same manner as the other multiple address latches such as latch 311 of the program store, FIG. 3 which previously have been described. It should be noted that the circuitry of the MBM controller functions in a manner similar to that of the program store or the activity store under control of a computer unit.

When the main memory is to be read by one of the computer units, the read/write flip-flop 1013, FIG. 18, will be reset by the signal applied on lead SOUT0 by the requesting unit. The resetting of flip-flop 1013 will cause flip-flop 1014, which is the request flip-flop, to be set via gate 1037. (Flip-flop 1014 was reset at the same time that the address counter 1016 was cleared.) The mass memory unit MM will now fetch the first word of the block defined by the address information on the BLK ADD bus. After the first word has been fetched from mass memory unit MM, it will make the signal on lead MBMCPTE true. This will cause monostable 1015 to emit a pulse causing the output of gate 1036 to go high which, in turn, will cause the output of gate 1033 to increment address counter 1016. In addition, the output of gate 1036 will enable the load input of shift register 1008, 1009 and 1010 causing the data which is on buses OMBMD 8-15 and OMBMD 0-7 to be loaded into these shift registers.

When the output of gate 1034, FIG. 18, is true, monostable 1029 will also be triggered which, in turn, will cause gate 1028 to set flip-flop 1026 via NOR gate 1030. The setting of flip-flop 1026 will cause the signal on lead MBMREQ to become true. The signal on lead MBMREQ denotes a request for access to the activity store and, when the activity store grants this request, it applies a signal on lead AMBMACK. When the signal on lead AMBMACK is true, flip-flop 1026 is reset. The resetting of flip-flop 1026 triggers monostable 1025 which, in turn, sets flip-flop 1023. Upon the setting of flip-flop 1023, gate 1020 will permit 16 pulses to be passed from oscillator 1022 through gate 1020 to clock the output of address information contained in shift register 1008 onto line MBMDA via multiplexer 1017. Multiplexer 1017 is also controlled by the output of flip-flop 1023 and, when flip-flop 1023 is set, it selects the B input of multiplexer 1017 to be placed on the multiplexer output, lead MBMDA. After 16 pulses have been output, the carry out output of counter 1018 will reset flip-flop 1023 via the clock input. In addition, the carryout of counter 1018 will set flip-flop 1024 via the preset input. Upon the setting of flip-flop 1024, gate 1021 will permit 8 pulses to be passed from oscillator 1022 to clock the information contained in shift registers 1009 and 1010, FIG. 17, out onto lines MBMDA and SMBMD, respectively. Whenever flip-flop 1023 or 1024 is set, OR gate 1027, FIG. 18, makes the signal on lead WMBMD true to indicate that the main memory controller is active. Flip-flop 1024 is reset at the end of 8 pulses via the carryout output of counter 1019.

The request flip-flop 1014 is set when the address counter 1016 is incremented until the carry output goes true, thereby resetting flip-flop 1014 via the clock input.

With respect to the flow chart of FIG. 14, assume that the write MBM path is chosen. The read-write flip-flop 1013 is set via the SOUT1 signal from the computer unit. The SOUT1 signal also causes gate 1037 to set the request flip-flop 1014. The setting of flip-flop 1014 will cause monostable 1031 to trigger which, via gates 1028 and 1030, will set flip-flop 1026. The setting of flip-flop 1026 then will cause shift registers 1008, 1009 and 1010 to transmit their contents to the activity store or the program stores. However, the memory unit will ignore the contents of shift registers 1009 and 1010 and instead will return information via shift registers 1011 and 1012 on the last 8 clock pulses. The two bits which buffer 1041 jam-sets into the most significant bits of shift register 1008 instruct the activity memory whether it is to perform a read or write operation. These are the same bits as microprocessor 601 generates when it reads or writes the activity store or one of the program stores.

After the information is obtained from the activity store and placed in shift registers 1011 and 1012, the mass memory MM completes its own internal timing, and the information on buses IMDMD 8-15 and IMDMD 0-7 is written into the proper word in the address block. After the operation is complete, the mass memory MM will return the MBMCPTE signal which will cause monostable 1015 to trigger. Gate 1024 is thereby activated which, in turn, will activate gate 1034 to control the selection of the next word in the same way as was described for the read operation. In addition, the activation of monostable 1015 activates gate 1032 which, via NOR gate 1030, will set flip-flop 1026 allowing the next word that is to be written into mass memory MM to be fetched from the activity store.

It should be noted here that in the illustrative embodiment, while data can be read out of the main memory unit and transmitted to either a program store unit or to the activity store, only information from the activity memory can be written into the main memory unit. The reason for this limitation is that the illustrative main memory operates with a 16-bit word and, to generate this word and cause it to be transmitted to the shift registers 1011 and 1012, additional hardware is required in the memory unit. Hence, the restriction was made that information would only be written into the main memory from the activity store. Thus, in the embodiment illustrated, if it were necessary to take information from a program store and write it into the main memory, the information would first have to be transmitted from the program store to the activity store. The clock information which is required by the program store and activity store is coupled by OR gate 1042 follows the clocking information outputs of gates 1020 and 1021.

In the foregoing description it should be noted that the main memory controller has been described to function in a manner such that a computer unit transmits to it as if it was a program store or an activity store. The main memory unit controller duplicates all data signals and clock signals that the computer unit would provide, including the reset signal MBMRS. The computer unit which causes the initial transfer is informed when the transfer is complete by the appearance of the DONE signal provided at the $\overline{Q}$ output of flip-flop of 1014. When this signal is high, the transfer is complete.

Following are the tables:

TABLE I

ROM 319 (FIG. 3)

| INPUTS | | OUTPUTS | | | | |
|---|---|---|---|---|---|---|
| LEAD 330 | CABLE 307 | $O_4$ | $O_3$ | $O_2$ | $O_1$ | NOTES |
| X | 0 | 1 | 0 | 0 | 0 | |
| X | 1 | 1 | 0 | 0 | 0 | |
| X | 2 | 1 | 0 | 0 | 0 | |
| X | 3 | 1 | 0 | 0 | 0 | |
| X | 4 | 1 | 0 | 0 | 0 | |
| X | 5 | 1 | 0 | 0 | 0 | |
| X | 6 | 1 | 0 | 0 | 0 | |
| X | 7 | 1 | 0 | 0 | 0 | |
| X | 8 | 0 | 1 | 0 | 0 | |
| X | 9 | 0 | 1 | 0 | 0 | |
| X | A | 0 | 1 | 0 | 0 | |
| X | B | 0 | 1 | 0 | 0 | |
| X | C | 0 | 1 | 0 | 0 | |
| X | D | 0 | 1 | 0 | 0 | |
| X | E | 0 | 1 | 0 | 0 | |
| 0 | F(=16) | 0 | 1 | 1 | 0 | Read memory 331- |
| 1 | 1-0 | 0 | 0 | 0 | 0 | |
| 1 | 1-1 | 0 | 0 | 0 | 0 | |
| 1 | 1-2 | 0 | 0 | 0 | 0 | |
| 1 | 1-3 | 0 | 0 | 0 | 0 | |
| 1 | 1-4 | 0 | 0 | 0 | 0 | |
| 1 | 1-5 | 0 | 0 | 0 | 0 | |
| 1 | 1-6 | 0 | 0 | 0 | 0 | |
| 1 | 1- | | | | | |
| 0 0 0 1 | Write Memory 331-2 | | | | | |

TABLE II

| | MSB of 502 | | | | | | LSB of 503 | | | | | |
|---|---|---|---|---|---|---|---|---|---|---|---|---|
| | $Q_F$ | $Q_E$ | $Q_D$ | $Q_C$ | $Q_B$ | $Q_A$ | | $4^{th}$ Bit | | | | |
| | $A_{13}$ | $A_{12}$ | $A_{11}$ | $A_{10}$ | $A_9$ | $A_8$ | $A_7$ . . . | | $A_3$ | $A_2$ | $A_1$ | $A_1$ |
| P STORE 507 | 1 | 1 | 1 | 1 | 1 | 1 | X | | X | X | X | X |
| P STORE 506 | 1 | 1 | 1 | 1 | 1 | 0 | X | | X | X | X | X |
| ELM 510 | 1 | 1 | 1 | 1 | 0 | 1 | X | | X | X | X | X |
| AL 513 | 1 | 1 | 1 | 1 | 0 | 0 | | 0 | X | X | X | |
| Interf. 514 | 1 | 1 | 1 | 1 | 0 | 0 | | X 1 | X | X | X | |

TABLE III

| | |
|---|---|
| $\overline{T3A}$ | The inverted Q output of flip-flop 620 inhibits AND gate 626. |
| EDATA | Output of AND gate 622 enables buffer 534. |
| LDDATA* | Q output of flip-flop 616 provides parallel load enable signal for shift register 518 to load contents of buffer 602. |
| 578 | Output of AND gate 614 provides load enable for shift register 503 to load lower 8-bits of address from buffer 602. |
| 517 | Output of AND gate 612 provides enable input for shift register 502 to accept 6-bit address and 2 control bits provided by buffer 602. |
| SINO | A decoder 624 output that provides enable input to buffer 532 for I/O data input from peripheral unit. |
| SOUTO | A decoder 625 output that clocks latches 533 to store parallel output of shift register 503. |

TABLE IV

(MCS-8 Cycles)

| Type Cycle | Note |
|---|---|
| PCI | Instruction cycle; read first inst. byte. |
| PCR | Read cycle; read data or add'l inst. byte(3). |
| PCC | Command cycle; data I/O. |
| PCW | Write Cycle; write data into RAM. |

V

(MCS-8 States)

| State | S2 | S1 | S1 | Note |
|---|---|---|---|---|
| T1 | 0 | 1 | 0 | Low order memory address out. |
| T1I | 1 | 1 | 0 | Interrupt |
| T2 | 1 | 0 | 0 | Higher ord. addr., two bits control out. |
| WAIT | 0 | 0 | 0 | Wait for slow memory. |
| T3 | 0 | 0 | 1 | Inst. or data fetch or data out. |
| STOPPED | 0 | 1 | 1 | Halt inst. received. |
| T4 | 1 | 1 | 1 | Execution of instruction. |
| T5 | 1 | 0 | 1 | Execution of instruction. |

I claim:

1. A data processing system comprising:
a plurality of cache program stores ($PS_{(o)}$-$PS_{(n+1)}$) for storing programs;
a main memory unit (MBM) for storing programs and for being responsive to computer unit signals for transmitting programs to said cache program stores;
a plurality of computer units ($MP_{(o)}$-$M_{(n)}$) for executing programs stored in said plurality of cache program stores on a nondedicated basis; and
first transmission means (101, 102, 103, 104, 105) interconnecting said plurality of cache program stores, said plurality of computer units and said main memory unit; characterized in that
said plurality of cache program stores is greater in number than said plurality of computer units;
said data processing system further comprising activity memory means (2001, 2002, 2003) for specifying the next program to be transmitted by said main memory unit and specifying the cache program store to which said main memory unit is transmitting;
second transmission means (ACTDATA, 490) for interconnecting said activity memory means and said plurality of computer units;
each of said computer units includes means for accessing said activity memory means and responsive to the content of said activity memory means for generating and for transmitting to said main memory unit said computer signals defining said next program and the cache program store to be loaded and for seizing the cache program store defined by said activity memory means which has previously been caused to be loaded from the main memory unit by another computer unit and for updating said activity memory means, upon completion of a program in a previously assigned cache program store, whereby, said computer units are executing programs out of temporarily assigned cache program stores while the main memory unit is loading another program into an unassigned cache program store.

2. A data processing system in accordance with claim 1 wherein said activity memory means comprises a plurality of status words (2002) for identifying programs, a program address counter (2001) for defining a specified one of said status words, and a cache program store register (2003) for identifying the cache program store presently being loaded by said main memory unit;

each computer unit includes means for accessing contents of said program address counter and for identifying said next program to be loaded by accessing contents of status word specified by said contents of said program address counter and to start executing that program in the cache program store specified by contents of said cache program store register, upon completion of a program in a previously assigned cache program store.

3. A data processing system according to claim 1 wherein each of said cache program stores includes a first (332) and a second (331) random access memory unit;

means responsive to a read or write command from any of said computer units ($MP_{(o)}$-$MP_{(n)}$) for reading or writing a single word which is transmitted via said first transmission means to or from the computer unit in one of said random access memory units; and means responsive to a write command signal from said main memory unit for transferring information from said main memory unit into both said first and said second random access memory units of said cache store memory units simultaneously.

4. A data processing system according to claim 1, further comprising means (317, SMBMD) for transferring a predetermined contents of said main memory unit (MBM) to said cache program store defined by said memory means.

5. A data processing system according to claim 4 wherein each of said cache program stores has a pair of memory units (331, 332);

first means (322, 321) controlled by said transfer means for simultaneously loading said pair of memory units from said main memory unit; and second means (324, 329-1, 329-2, 325, PDATAn) responsive to a read request and a cache program store address furnished by one of said computer units for delivering the contents of a word location in only one of said pair of memory units to the requesting one of said computer units.

6. A data processing system according to claim 4 wherein said first means comprises:

a first shift register (322) for receiving a serial string of data from said main memory unit and for directly applying said string in parallel to a first one (331) of said pair of memory units and second shift register means (321) for receiving a serial string of data from said main memory unit and for selectively delivering said string in parallel to said first one (331) or the other (332) of said pair of memory units.

7. A data processing system comprising:

a plurality of cache program stores ($PS_{(o)}$-$PS_{(n+1)}$) for storing programs;

a main memory unit (MBM) for storing programs and for being responsive to computer unit signals for transmitting programs to said cache program stores;

a plurality of computer units ($MP_{(o)}$-$M_{(n)}$) for executing programs stored in said plurality of cache program stores on a nondedicated basis; and first transmission means (101, 102, 103, 104, 105) interconnecting said plurality of cache program stores, said plurality of computer units and said main memory unit; characterized in that said plurality of cache program stores is greater in number than said plurality of computer units;

said data processing system further comprising activity memory means (2001, 2002, 2003) for specifying the next program to be transmitted by said main memory unit and specifying the cache program store to which said main memory unit is transmitting;

second transmission means (ACTDATA, 490) for interconnecting said activity memory means and said plurality of computer units; said cache program stores further comprising bus selectors (PA) for coupling said cache program stores to said first transmission means;

said first transmission means comprising a plurality of common data output buses ($PDATA_{(o)}$-$PDATA_{(n+1)}$) connected to couple data from a different one of said cache program stores to all of said computer units, a common address bus (101) extending from all computer units to all of said cache program stores for conveying address signals from one of said computer units to said bus selectors (PA) of said cache program stores, and data and address input buses (102, 103, 105) extending from each of said computer units to all of said cache program stores for conveying memory address and data signals respective to one of said cache program stores;

each of said computer units includes means for accessing said activity memory means and responsive to the content of said activity memory means for generating and for transmitting to said main memory unit said computer signals defining said next program and the cache program store to be loaded and for seizing the cache program store defined by said activity memory means which has previously been caused to be loaded from the main memory unit by another computer unit and for updating said activity memory means, upon completion of a program in a previously assigned cache program store, whereby, said computer units are executing programs out of temporarily assigned cache program stores while the main memory unit is loading another program into an unassigned cache program store.

8. The invention of claim 7 in which said common address bus (101), said data and address buses (102, 103 and 105) extend to said main memory unit (MBM) for permitting any of said computer units to address said main memory unit to transmit said computer unit signals for causing said main memory unit to deliver an identifiable data string to any of said cache program stores.

9. A data processing system comprising:

a plurality of cache program stores $(PS_{(o)}\text{-}PS_{(n+1)})$ for storing programs;

a main memory unit (MBM) for storing programs and for being responsive to computer unit signals for transmitting programs to said cache program stores;

a plurality of computer units $(MP_{(o)}-M_{(n)})$ for executing programs stored in said plurality of cache program stores on a nondedicated basis; and first transmission means (101, 102, 103, 104, 105) interconnecting said plurality of cache program stores, said plurality of computer units and said main memory unit; characterized in that said plurality of cache program stores is greater in number than said plurality of computer units and each of said cache program stores having a pair of first and second memory units (331, 332), means (322) for coupling said first memory unit (331) to said first transmission means and means (312, 313, 314, 333) for coupling said second memory unit (322) to said first transmission means to simultaneously receive signals from said main memory unit, and means (312, 313, 314, 333) for selecting memory addresses and data signals which are transmitted via said first transmission means from one of said computer units for accessing either said first or said second memory units;

said data processing system further comprising activity memory means (2001, 2002, 2003) for specifying the next program to be transmitted by said main memory unit and specifying the cache program store to which said main memory unit is transmitting;

second transmission (ACTDATA, 490) means for interconnecting said activity memory means and said plurality of computer units;

each of said computer units includes means for accessing said activity memory means and responsive to the content of said activity memory means for generating and for transmitting to said main memory unit said computer signals defining said next program and the cache program store to be loaded and for seizing the cache program store defined by said activity memory means, which has previously been caused to be loaded from the main memory unit by another computer unit and for updating said activity memory means upon completion of a program in a previously assigned cache program store, whereby, said computer units are executing programs out of temporarily assigned cache program stores while the main memory unit is loading another program into an unassigned cache program store.

10. The invention of claim 9 wherein said means for selecting said memory address and data signals from said one of said computer units or said main memory unit comprises:

a data/address circuit input (COMP0DA-COMP-2DA) respective to each of said computer units;

a request signal circuit input (ALCODE0-ALCODE2) respective to each of said computer units; and means (311) responsive to a signal on one of said request circuits for selecting input address and data signals from a requesting one of said computer units to access said first and said second memory of said one of said cache program stores.

11. The invention of claim 10 wherein each of said cache program stores includes a programmable read-only memory (PROM) containing a fixed sequence of control signal sets to direct the accessing of said memory units (331, 332) and means (COMP0CLK-COMP2CLK, 318) for providing sequential clock signals to control the sequential read-out of said control signal sets under the control of a requesting one of said computer units.

* * * * *